(12) United States Patent
So et al.

(10) Patent No.: US 8,090,920 B2
(45) Date of Patent: Jan. 3, 2012

(54) RECORDING MEDIUM, AND INFORMATION PROCESSING DEVICE AND INFORMATION PROCESSING METHOD FOR THE RECORDING MEDIUM

(75) Inventors: Hirokazu So, Osaka (JP); Makoto Ochi, Osaka (JP); Takuji Maeda, Osaka (JP); Masato Suto, Osaka (JP); Kazuya Fujimura, Nara (JP); Shinji Inoue, Osaka (JP); Yukiko Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 549 days.

(21) Appl. No.: 11/571,594

(22) PCT Filed: Jul. 5, 2005

(86) PCT No.: PCT/JP2005/012400
§ 371 (c)(1),
(2), (4) Date: May 11, 2007

(87) PCT Pub. No.: WO2006/004113
PCT Pub. Date: Jan. 12, 2006

(65) Prior Publication Data
US 2007/0226399 A1    Sep. 27, 2007

(30) Foreign Application Priority Data

Jul. 6, 2004  (JP) .................................. 2004-199174

(51) Int. Cl.
*H04L 9/00* (2006.01)
*G06F 21/00* (2006.01)
(52) U.S. Cl. ......... 711/164; 713/189; 713/193; 380/277
(58) Field of Classification Search .................. 711/164; 713/189, 193; 380/277
See application file for complete search history.

(56) References Cited

U.S. PATENT DOCUMENTS 6,553,180 B1    4/2003  Kikuchi et al.
6,792,280 B1 *  9/2004  Hori et al. ..................... 455/517
7,203,312 B1    4/2007  Hatanaka et al.

(Continued)

FOREIGN PATENT DOCUMENTS

CN         1313988        9/2001

(Continued)

OTHER PUBLICATIONS

English language Abstract of JP 2002-358732.

(Continued)

*Primary Examiner* — Brian Peugh
*Assistant Examiner* — Nicholas Simonetti
(74) *Attorney, Agent, or Firm* — Greenblum & Bernstein, P.L.C.

(57) ABSTRACT

A recording medium stores contents and contents keys to be used for encrypting the contents, in a plurality of storage formats. The storage formats include a storage format (a first format) for delivered contents acquired through a network, and a storage format (a second format) for local contents acquired by a method other than the delivery. The intrinsic storage formats of the contents to be stored in the recording medium are determined according to the kinds of the contents. The recording medium stores not only the contents and the contents keys but also original storage format information (an import flag) (851) which is information indicating the intrinsic storage formats of the contents. With reference to the original storage format information, a reproduction device selects a reproduction method in accordance with the intrinsic storage formats of the contents.

7 Claims, 21 Drawing Sheets

U.S. PATENT DOCUMENTS

| | | | |
|---|---|---|---|
| 7,412,459 B1 * | 8/2008 | Johnson et al. | 707/104.1 |
| 7,565,399 B1 * | 7/2009 | Goel | 709/203 |
| 2001/0013039 A1 * | 8/2001 | Choi | 707/104.1 |
| 2002/0048054 A1 * | 4/2002 | Ohata et al. | 358/500 |
| 2002/0107595 A1 * | 8/2002 | Abe et al. | 700/94 |
| 2002/0141737 A1 | 10/2002 | Fuchigami | |
| 2002/0154779 A1 * | 10/2002 | Asano et al. | 380/277 |
| 2003/0009681 A1 * | 1/2003 | Harada et al. | 713/193 |
| 2003/0014310 A1 * | 1/2003 | Jung et al. | 705/14 |
| 2003/0014637 A1 * | 1/2003 | Ellison et al. | 713/178 |
| 2003/0097340 A1 * | 5/2003 | Okamoto et al. | 705/65 |
| 2003/0152222 A1 * | 8/2003 | Nakano et al. | 380/201 |
| 2004/0107356 A1 * | 6/2004 | Shamoon et al. | 713/193 |
| 2004/0172376 A1 * | 9/2004 | Kobori et al. | 707/1 |
| 2004/0190868 A1 * | 9/2004 | Nakano et al. | 386/94 |
| 2005/0018854 A1 * | 1/2005 | Yamamoto et al. | 380/277 |
| 2005/0021774 A1 * | 1/2005 | Kurihara et al. | 709/228 |
| 2005/0025316 A1 * | 2/2005 | Pelly et al. | 380/277 |
| 2005/0154907 A1 * | 7/2005 | Han et al. | 713/193 |
| 2005/0216684 A1 | 9/2005 | So et al. | |
| 2005/0231765 A1 | 10/2005 | So et al. | |
| 2006/0050622 A1 | 3/2006 | So et al. | |
| 2006/0230460 A1 * | 10/2006 | Hars | 726/27 |
| 2007/0033364 A1 | 2/2007 | Maeda et al. | |
| 2007/0055819 A1 | 3/2007 | So et al. | |

FOREIGN PATENT DOCUMENTS

| | | | |
|---|---|---|---|
| CN | 1382291 | | 11/2002 |
| EP | 1221691 | | 7/1928 |
| EP | 1045387 | | 10/2000 |
| EP | 1045387 | A1 * | 10/2000 |
| EP | 1052644 | | 11/2000 |
| EP | 1 120 715 | * | 1/2001 |
| JP | 2000-357201 | | 12/2000 |
| JP | 2000-358003 | | 12/2000 |
| JP | 2001-249695 | | 9/2001 |
| JP | 2002-358732 | | 12/2002 |
| JP | 2004-127159 | | 4/2004 |

OTHER PUBLICATIONS

English language Abstract of JP 2000-358003.
English language Abstract of JP 2000-357201.
English language Abstract of JP 2004-127159.
English language Abstract of JP 2001-249695.
U.S. Appl. No. 11/571,363 to Ochi et al., filed on Dec. 28, 2006.
Philip Lynx, "Is it technically impossible to apply CSS on DVD–RW and DVD+RW?", Internet Citation, [Online], Jun. 22, 2004, XP007902518, Retrieved from the Internet, URL:http://answers.google.com/answers/threadview?id=348912>.

* cited by examiner

Fig. 18

■ CONTENT LIST

| TITLE | ARTIST NAME | ... | PLAYBACK TIME | | |
|---|---|---|---|---|---|
| Song_AAA | xxx | ... | 3 : 21 | edit | Info — 831, 833 |
| Song_BBB | xxx | ... | 5 : 32 | Info | |
| Song_CCC | yyy | ... | 3 : 24 | edit | |
| Song_DDD | zzz | ... | 6 : 26 | Info | |
| Song_EEE | xxx | ... | 4 : 04 | ... | |
| ... | ... | ... | ... | | |
| Song_ZZZ | yyy | ... | 3 : 54 | edit | |

Fig.19

| CONTENT DETAIL INFORMATION | |
|---|---|
| TITLE | Song_BBB |
| ARTIST NAME | xxx |
| PLAYBACK TIME | 5 : 32 |
| PRODUCT SOURCE | ppppp |
| PURCHASE DATE | 2004/06/29 18 : 02 |
| PURCHASE PRICE | ¥200 |
| INFORMATION FOR LATEST ALBUM OF THE ARTIST | 2004/04/01 RELEASED "zzzzzzzzzzzzzz" (3000円) |
| ... | ... |

*Fig.21*

| CONTENT | IMPORT FLAG |
|---|---|
| CONTENT A | IMPORT FLAG A |
| CONTENT B | IMPORT FLAG B |
| . . . | . . . |
| . . . | . . . |
| CONTENT X | IMPORT FLAG X |
| . . . | . . . |

RECORDING MEDIUM, AND INFORMATION PROCESSING DEVICE AND INFORMATION PROCESSING METHOD FOR THE RECORDING MEDIUM

TECHNICAL FIELD

The present invention relates to a recording medium which stores digital data in compliance with a plurality of storage specifications, and an information processing device and an information processing method that carries out processing such as playback, recording, editing, and so on for the digital data stored in such recording medium.

BACKGROUND ART

For recording media to record music contents, motion picture contents, still image contents, and other various kinds of digital data (hereinafter called the "content"), there exist a wide variety of media including semiconductor recording media, magnetic disks, optical disks, magneto-optical disks, and others.

In particular, semiconductor recording media have features of small size and light weight, and in recent years, increased capacity, increased speed, and price reduction are rapidly taking place, and are able to be used in various devices including digital cameras, cellular phones, portable music players, TV sets, and DVD recorders. Examples of typical semiconductor recording media include SD Memory Card (registered trademark), Memory Stick (registered trademark), Compact Flash (registered trademark), and so on.

The semiconductor medium of SD Memory Card, and so on which have copyright protection functions, can prevent unauthorized copying, and can safely record proprietary content.

One example of content storage method which has been achieved in semiconductor media with copyright protection function is described as follows.

The semiconductor recording medium includes a protection area which a host device is allowed to be accessed only by authenticating the mutual validity between a semiconductor recording medium and host device (reproducing device or recording device, etc.) and a normal area to which the host device can gain free access. And in the normal area, encrypted content is recorded and a key for encrypting the content (hereinafter called the "content key") is stored in the protection area. The content recorded in this way can prohibit playback by an unauthorized device which fails mutual authentication. This is because the unauthorized device can not read the content key and not decode the encrypted content. Furthermore, even if the encrypted content only stored in the normal area is copied into other recording medium, the unauthorized device is unable to copy the content key, and thus no content key exists in the copy destination recording medium. Consequently, playback of the unauthorized copied encrypted content can be prohibited.

Conventionally, for content to be stored in a semiconductor recording medium with copyright protection function by the above-mentioned storing method, music content, etc. ripped from music CDs which users purchased were dominant.

However, in recent years, various applications have been developed for various kinds of contents using copyright protection functions of the semiconductor recording medium.

For example, it has become possible to download content with copyrights of music and books from content providers using a PC connected to Internet by paying the required price, store the downloaded content in the semiconductor recording medium, and enjoy the music content or read the book content stored in the semiconductor medium by a small-size semiconductor player.

In addition, it is possible to purchase content not only in PC connected to Internet but also in electronic terminals (KIOSK terminals) located in specific places such as convenience stores, specified shops, and stations. Because these applications provide users with high convenience and expand various selling networks for content providers, too, it is assumed that still more diversified kinds of content and use environment come in wide use in the future.

Specifications for storing various kinds of contents with copyright in the semiconductor recording medium as described above are generally defined in accordance with characteristics of semiconductor recording medium and various kinds of contents. A recording device records content according to the specifications. This allows content to be played back by a reproducing device which conforms to the specifications.

More specifically, to take a music application program as an example, the content which corresponds to music is encrypted by a content key, and the content key and encrypted content are stored in a semiconductor recording medium.

Patent document 1 discloses a semiconductor recording medium that stores multiple content keys in a protection area by the arrangement of the specified order, and stores the encrypted contents and management information for them in a normal area. This semiconductor recording medium can easily sort music playback order or delete a part of music contents while preventing illegal copy of music contents, resulting in extremely high convenience.

Patent document 1: JP-A-2001-249695

DISCLOSURE OF INVENTION

The above-mentioned technique has the following problems.

In the future, regarding specifications for storing content keys and encrypted contents for use of copyright functions of the semiconductor recording medium, various types may be formulated in accordance with the stored semiconductor medium and kind of content. In addition, even for the same kind of contents, multiple storage specifications may be formulated in accordance with the distribution channel of the content.

For example, even for storage specifications intended for the same music content, there is a possibility that two kinds of storage specifications may be mixed, one is for the content acquired by ripping from CDs and the other is for the content acquired via communication lines such as Internet, and so on. This is because each of storage specifications is not always defined by the same entity.

Consequently, even for the same music content, reproducing devices and recording devices which conform to relevant storage specifications exist. Using reproducing devices and recording devices properly in accordance with storage specifications for the same music content results in extremely poor user friendliness. Therefore, a method to store the same content in the semiconductor recording medium in compliance with multiple storage specifications could be considered. This enables playback by reproducing devices complying with storage specifications.

However, when the relevant contents are stored in multiple storage specifications, it is difficult to know the origin of the content (for example, information as to whether it is the content obtained by ripping from CDs or whether it is the content obtained by delivery). Consequently, it is difficult for a reproducing device, recording device, and so on to change over their behaviors in accordance with the origin of the content.

The present invention, in consideration of the above-mentioned problems, has an object of the present invention is to provide a recording medium by which it is possible to easily determine the origin of the content stored in accordance with multiple specifications, as well as an information processor and an information processing method for processing the recording medium, such as playback, recording, editing, and so on.

In a first aspect of the invention, a recording medium stores content that has an intrinsic format for storage to the recording medium and is stored to the recording medium in multiple formats, a content key which is used for encrypting the content and is stored to the recording medium in multiple formats, and original storage format information which is information for indicating the intrinsic storage format of the content.

In a second aspect of the invention, a recording device records, in multiple formats, content that has an intrinsic format for storage to the recording medium and a content key which is a key for encrypting the content. The recording device includes: a first content writing unit that writes the content in the recording medium in a first storage format; a first key writing unit that writes the content key in the recording medium in the first storage format; a second content writing unit that writes the content in the recording medium in a second storage format; a second key writing unit that writes the content key in the recording medium in the second format; and a storage format information writing unit that writes original storage format information in the recording medium, the original storage format information indicating the intrinsic storage format of the written content.

In a third aspect of the invention, a recording method records content which has an intrinsic format for storage to a recording medium and a content key which is a key for encrypting the content. The recording method includes: writing the content in the recording medium in a first format storage format; writing the content key in the recording medium in the first storage format; writing the content in the recording medium in a second storage format; writing the content key in the recording medium in the second storage format; and writing original storage format information which indicates the intrinsic storage format of the content written in the recording medium.

In a fourth aspect of the invention, a reproducing device of a recording medium that stores content stored in multiple storage formats and a content key which is a key for encrypting the content as well as original storage format information indicating an intrinsic storage format of the content. The reproducing device includes: a content reading unit that reads the content to be reproduced from the recording medium; a key reading unit that reads out the content key for the content from the recording medium; a storage format identifying unit that reads out original storage format information for the content from the recording medium; and a content reproducing unit that changes over playback methods in accordance with the read original storage format information, and reproduces the content.

In a fifth aspect of the invention, a reproducing method of a recording medium that stores content stored in multiple storage formats and a content key which is a key for encrypting the content as well as original storage format information indicating an intrinsic storage format of the content. The reproducing method includes: reading original storage format information for content to be reproduced, from the recording medium; and changing over playback methods of the content in accordance with the read original storage format information.

In a sixth aspect of the invention, an information processing device of a recording medium that stores, in multiple storage formats, content, a content key which is a key for encrypting the content, and original storage format information which is information indicating an intrinsic storage format of the content. The information processing device includes: a reading unit that reads the content and the content key from the recording medium; a storage format identifying unit that reads the original storage format information for the content, from the recording medium; and a display unit that judges original storage format of the content based on the read original storage format information, changes and display the content and/or information on the content, according to the original storage format of the content.

In a seventh aspect of the invention, an information processing method of a recording medium that stores, in multiple storage formats, content, a content key which is a key for encrypting the content, and original storage format information which is information indicating an intrinsic storage format of the content. The information processing method includes: reading the content and the content key from the recording medium; reading the original storage format information for the content, from the recording medium; judging original storage format of the content based on the read original storage format information; and changing and displaying the content and/or information on the content, according to the original storage format of the content.

In an eighth aspect of the invention, an information processing device of a recording medium that stores, in a first and second storage formats, content, a content key for encrypting the content, and original storage format information which is information indicating an intrinsic storage format of the content. The information processing device includes: a first reading/writing unit that reads/writes the content and content key stored in the first storage format from/to the recording medium; a second reading/writing unit that reads/writes the content and content key stored in the second storage format, from/to the recording medium; a storage format identifying unit that reads the original storage format information from the recording medium; and an editing unit that edits the content and/or the information concerning the content. The editing unit changes over editable items for the content according to the read original storage format information.

In a ninth aspect of the invention, a method for editing content or information concerning the content to a recording medium, the recording medium storing, in a first and second storage formats, content, a content key for encrypting the content, and original storage format information which is information indicating an intrinsic storage format of the content. The editing method includes: referring to the original storage format information stored in the recording medium; and changing over editable items for the content according to the referred original storage format information.

According to the present invention, when one content is stored in conformity to multiple storage specifications, the original storage specification of the content can be easily identified, and therefore it is possible to change over processing such as playback, display, editing, and so on in accordance with the original storage specification.

BRIEF DESCRIPTION OF DRAWINGS

FIG. 18 is a diagram that indicates one example of a display screen with a list of contents displayed by a content display/edit unit 670 of an embodiment according to the present invention.

FIG. 19 is a diagram that indicates one example of a display screen with content detail information displayed by the content display/edit unit 670 in an embodiment according to the present invention.

FIG. 21 is a diagram that indicates control information for controlling the correspondence between contents and import flags.

| Reference Signs | |
| --- | --- |
| 100 | Semiconductor recording medium |
| 110 | Host interface unit |
| 120 | Control unit |
| 130 | Recording area (data storage unit) |
| 131 | Special area |
| 132 | Protection area |
| 133 | Normal area |
| 200 | Recording device |
| 210 | First format content and key receive unit |
| 221, 321 | First format content key writing unit |
| 222, 322 | Second Format content key writing unit |
| 224, 323 | Import flag setting unit |
| 230 | Content key format conversion unit |
| 241, 341 | First format content writing unit |
| 242, 342 | Second format Content writing unit |
| 250 | Content format conversion unit |
| 280, 380, 480, 680 | Recording medium |
| 300 | Recording device for local content |
| 370 | Content recording unit |
| 400 | Reproducing device for content distribution |
| 421 | First format content key reading unit |
| 425, 526, 625, 626 | Import flag identifying unit |
| 441 | First format content reading unit |
| 470, 570 | Content reproducing unit |
| 500 | Reproducing device for local content |
| 522 | Second format content key reading unit |
| 542 | Second format content reading unit |
| 600 | Content editing device |
| 621 | First format content key reading/writing unit |
| 622 | Second format content key reading/writing unit |
| 641 | First format content reading/writing unit |
| 642 | Second format content reading/writing unit |
| 670 | Content display/edit unit |
| 851, 853 | Import flag |

BEST MODE FOR CARRYING OUT THE INVENTION

Referring now to appended drawings, embodiments according to the present invention will be described.

1. System Configuration

Figure 1:
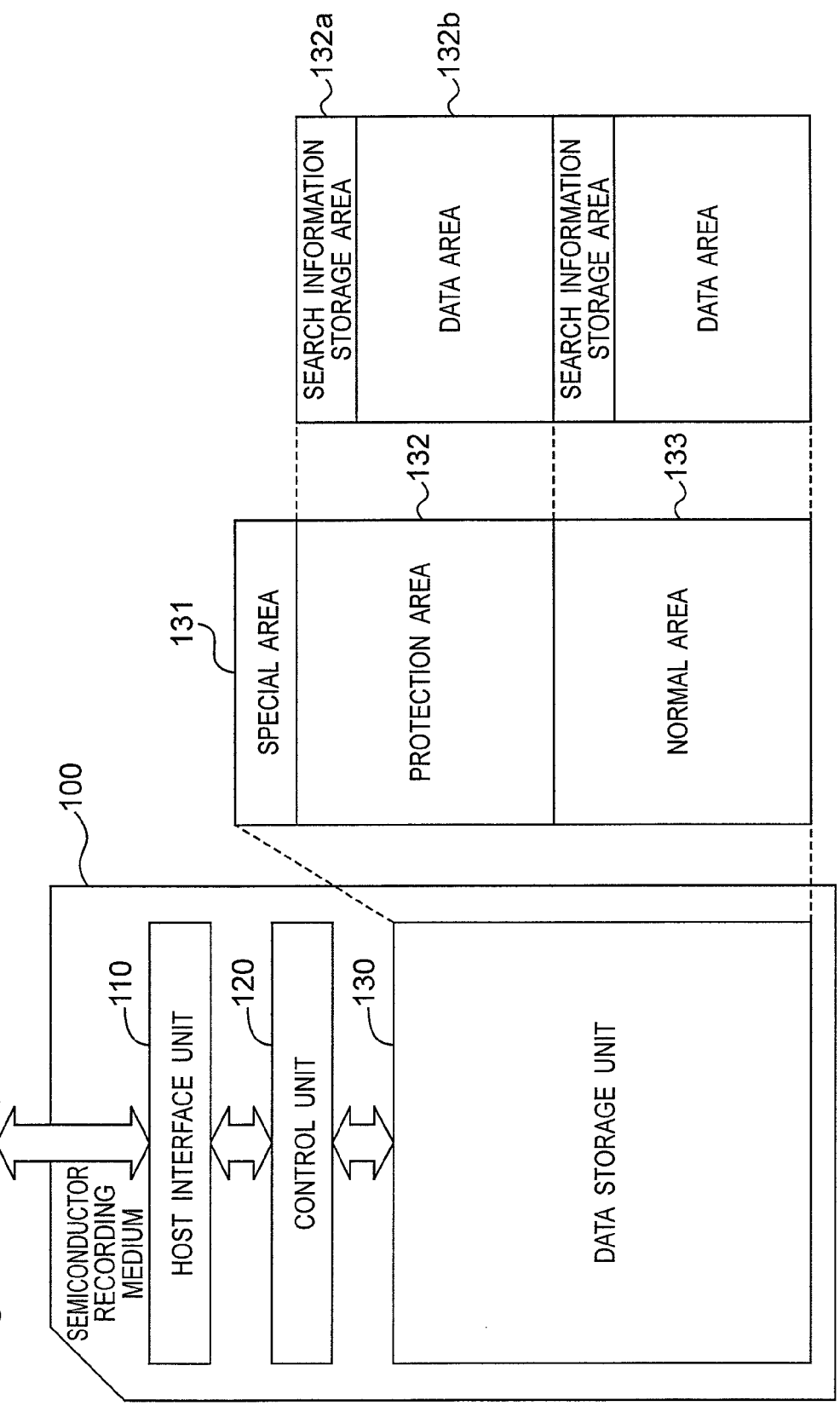
FIG. 1 is a diagram that indicates an example configuration of a semiconductor recording medium 100 of an embodiment according to the present invention.

FIG. 1 is a diagram that indicates a semiconductor recording medium 100 and an example configuration of the semiconductor recording medium 100.

The semiconductor medium 100 includes a host interface unit 110, control unit 120, and data storage unit 130.

The host interface unit 110 exchanges information with a host device (reproducing device, recording device, etc.) to the semiconductor recording medium 100.

The control unit 120 carries out internal control of the semiconductor recording medium 100. The control unit 120 interprets read and write commands received from the host device, accesses the recording area 130, and notify the result to the host device via the host interface unit 110 if necessary.

The data storage unit 130 is physically composed of non-volatile memory such as flash memory, and so on, and has a recording area that stores digital data. The recording area includes a special area 131, protection area 132, and normal area 133.

The special area 131 is an area which stores digital data used in the semiconductor recording medium 100, and is an area which the host device can not access directly. The special area 131 stores a media specific key as a value unique to the semiconductor recording medium 100 which is provided on manufacturing the semiconductor recording medium 100.

The protection area 132 is an area which is accessible only when the host device and the semiconductor recording medium 100 authenticate the validity each other. Consequently, only a host device which is successfully authenticated to the protection area 132 is allowed to read and write optional digital data.

The normal area 133 is an area which allows the host device to read and write any digital data. Unlike the protection area 132, the normal area 133 requires no mutual authentication of validity.

The protection area 132 and the normal area 133 have a search information storage area 132a and a data area 132b. The data area 132b is an area which stores any digital data. The search information storage area 132a is an area that stores information (address, size, and so on) that is necessary for retrieving each of digital data stored in the data area 132b by the host device.

In the present embodiment, each digital data should be controlled by a FAT file system, and the search information storage area 132a is an area which stores information (file system control information) required in the FAT file system.

Figure 2:
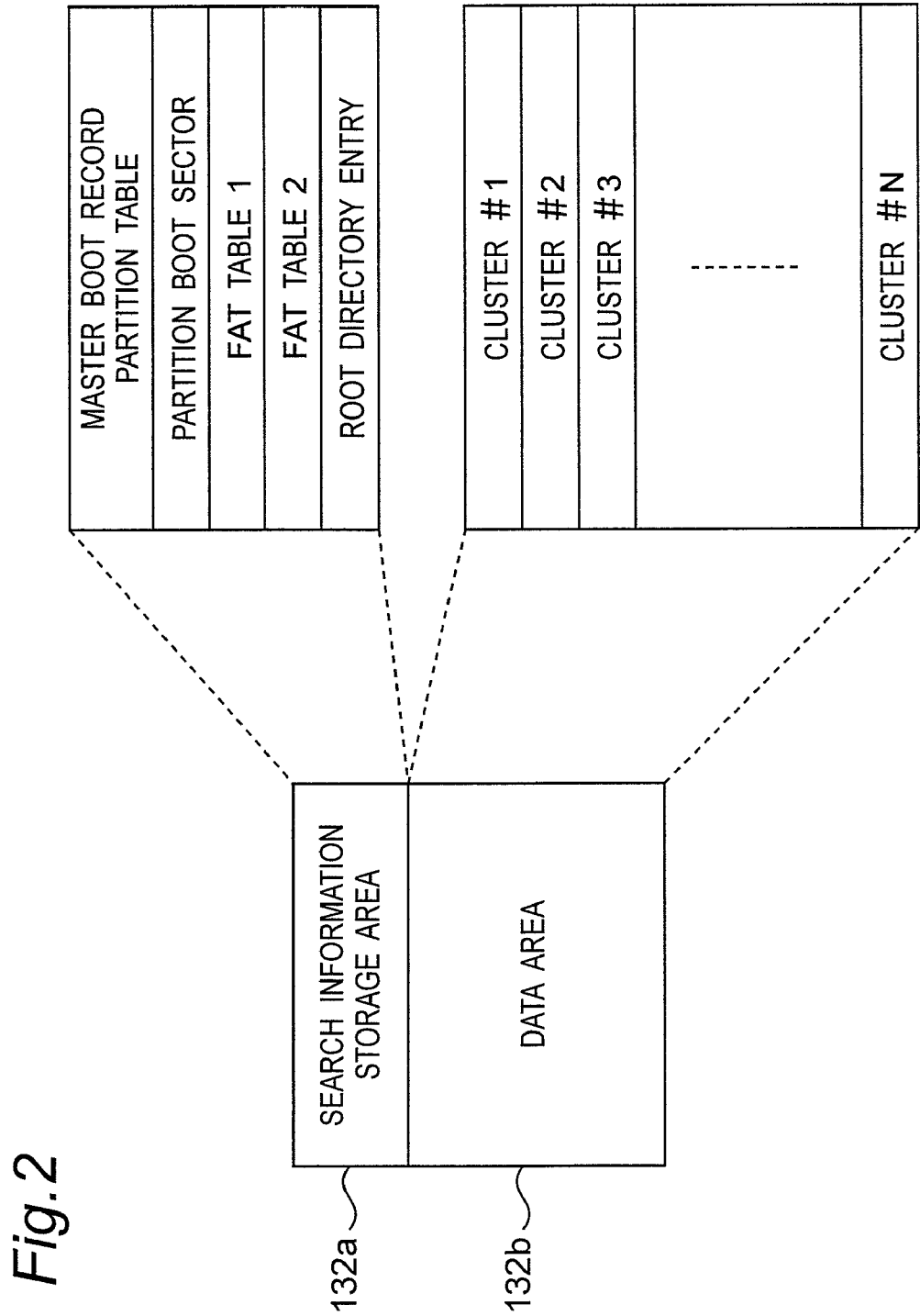
FIG. 2 is a diagram that indicates an example configuration of information search storage area and data area of an embodiment according to the present invention.

FIG. 2 shows an example configuration of the search information storage area 132a and the data area 132b when the FAT file system is adopted. In FIG. 2, the search information storage area 132a includes a master boot record partition table which stores information for dividing and controlling the data area 132b into multiple regions called "partition," a partition boot sector to store management information in one partition, FAT table 1 and FAT table 2 that indicate a storage position of the data contained in the file, and a root directory entry that stores information about files and the directories located right below the root directory. In addition, the data area 132b is divided into a unit called a "cluster" and managed by cluster.

2. Method for Storing Content Data

Referring now to FIG. 3 through FIG. 7, a content data storage method according to the present invention will be described.

2.1 Method for Storing Delivered Content

Figure 3:
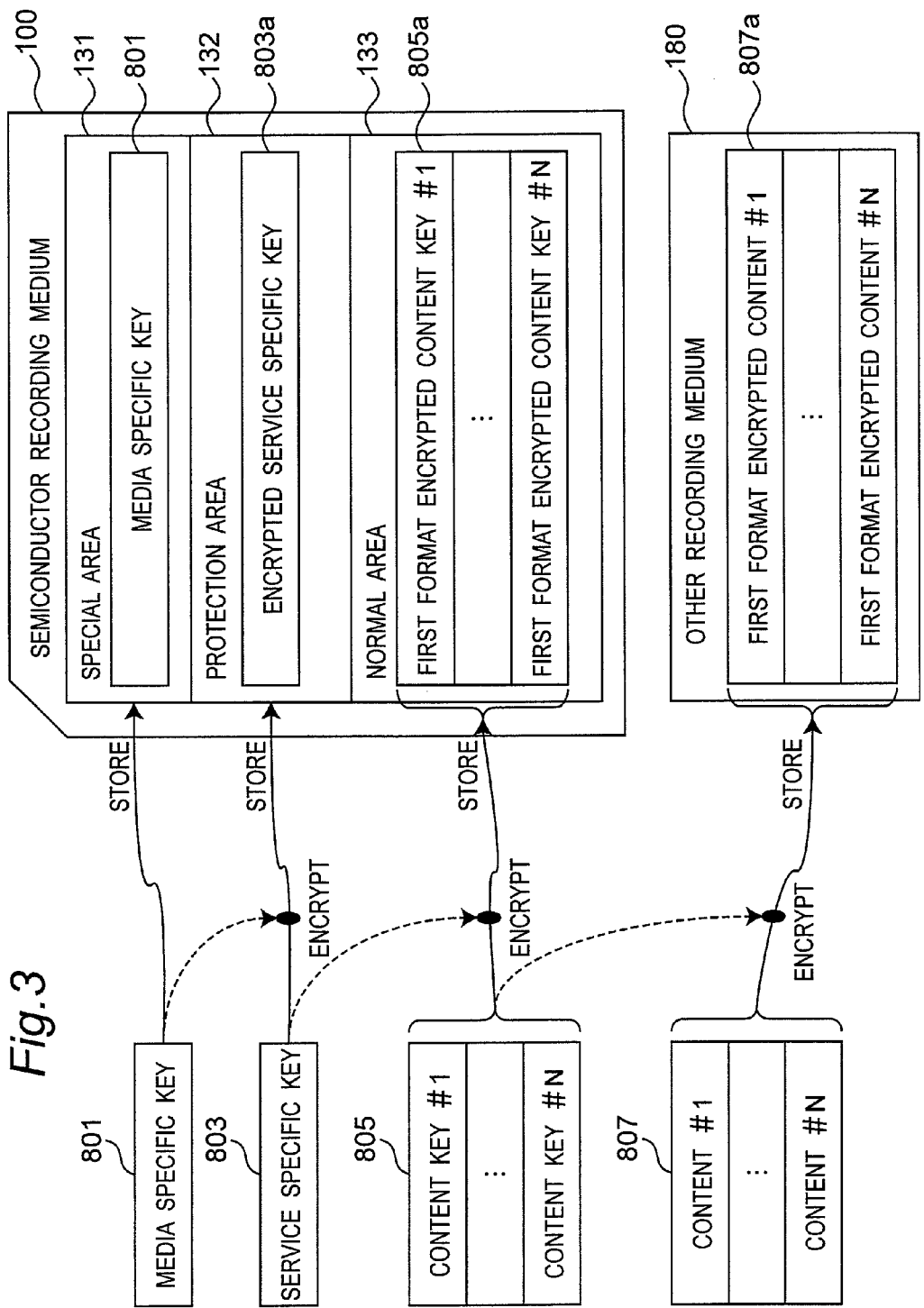
FIG. 3 is a diagram that indicates one example of storage methods of delivered content to the semiconductor recording medium 100 of an embodiment according to the present invention.

FIG. 3 shows a diagram that indicates one example of a method for storing delivered contents in the semiconductor recording medium 100. The storage format by this method is hereinafter called a "first format." For the storage format, there is a "second format" as described later in addition to the "first format." It is noted that the "delivered content" means the content obtained via a communication line such as Internet.

As shown in FIG. 3, in the first format, N delivered contents (content #1, . . . , content #N) 807 are encrypted with N content keys (content key #1, . . . , content key #N) 805, and are stored in an external recording medium 180 separate from the semiconductor recording medium 100 as N encrypted contents (encrypted content #1, . . . , encrypted content #N of the first format) 807a.

N content keys (content key #1, . . . , content key #N) 805 are encrypted with a service specific key 803 optionally defined by the delivery service, and are stored in the normal area 133 of the semiconductor recording medium 100 as N encrypted content keys (encrypted content key #1, . . . , encrypted content key #N of the first format) 805a.

The service specific key 803 is encrypted with a media specific key 801 which is a key specific to the semiconductor recording medium 100, and stored in the protection area 132 of the semiconductor medium 100 as the encrypted service specific key 803a. In the present embodiment, the service specific key 803 should be generated by a manufacturer who provides delivery service, and the manufacturer should store the encrypted service-specific key 803a in advance in the semiconductor recording medium 100. The service specific key 803 can be readout only by a recording device 200 for delivered content and a reproducing device 400 for delivered content discussed later.

The media specific key 801 itself is stored in the special area 131 when the semiconductor recording medium 100 is manufactured. The host device can read out the media specific key 801 only when the validity is mutually authenticated with the semiconductor recording medium 100.

Figure 4:
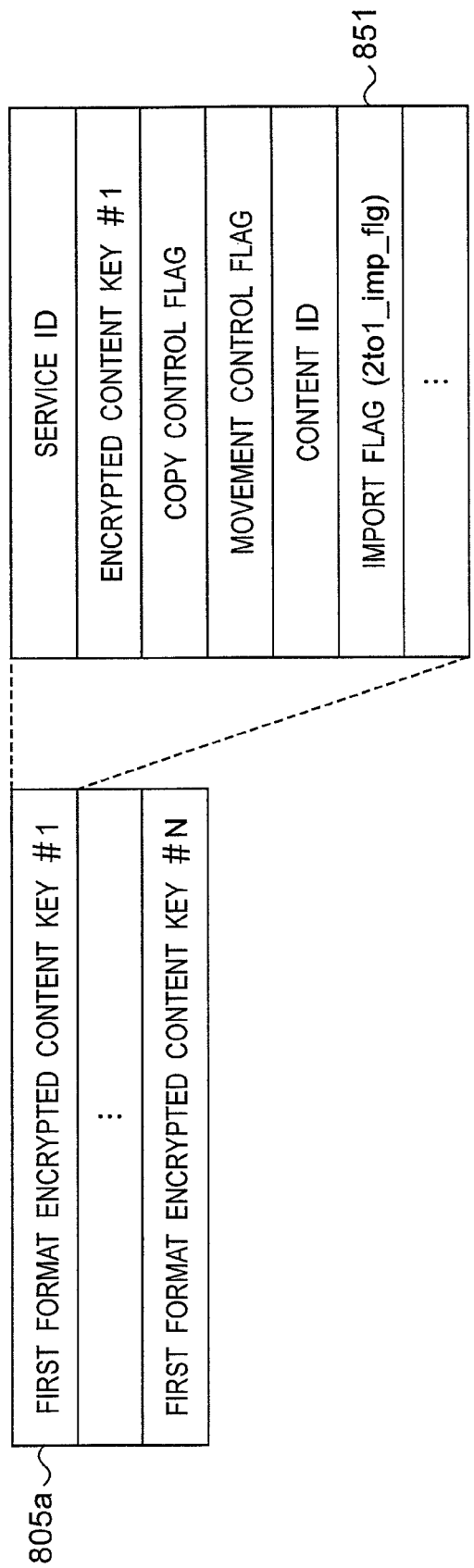
FIG. 4 is a diagram that indicates an example of data structure of the encrypted content key in a first format of an embodiment according to the present invention.

FIG. 4 is a diagram that indicates an example data configuration of the encrypted content key 805 of the first format. In the example of FIG. 4, the encrypted content key 805a of the first format includes the encrypted content key, service ID which is an identifier of delivery service, a copy control flag which stores control information for copying the associating content to other recording medium, a movement control flag which stores control information for moving the associating content to the other recording medium, content ID which is an identifier of the corresponding content, and so on.

Furthermore, the encrypted content key 805a of the first format stores an import flag (2to1_imp_flg) 851. The import flag is information that indicates primary format ("content root") of the content related to the encrypted content key. In other words, the import flag is information that indicates a format by which the content related to the encrypted content key should be originally or intrinsically stored (hereinafter called the "original storage format").

In the example of FIG. 4, the import flag (2to1_imp_flg) 851 is set to "OFF" when the content that corresponds to the content key is a content which should be originally stored in the first format (that is, the delivered content), and when the content which should be stored in a second format discussed later (that is, "local content") is converted into the first format, the import flag is set to "ON."

Consequently, the host device which can read out the content key of the first format can judge whether roots of the content is a delivered content or a local content by referring to the import flag (2to1_imp_flg) 851.

2.2 Method for Storing Local Content

Figure 5:
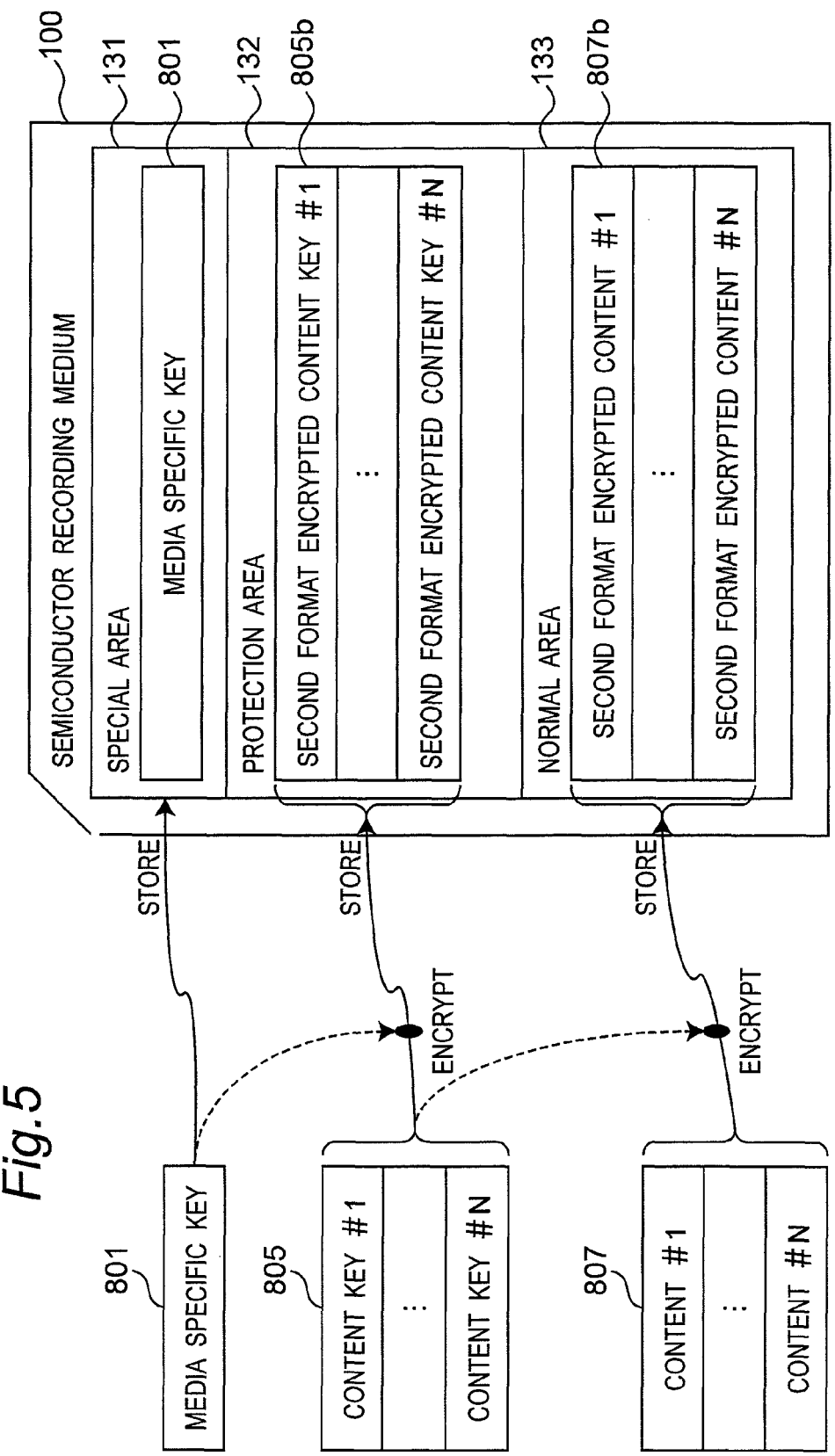
FIG. 5 is a diagram that indicates one example of storing local content in the semiconductor recording medium 100 of the embodiment according to the present invention.

FIG. 5 is a diagram that indicates one example of the method for storing the local content in the semiconductor recording medium 100. The storage format by this method is called "second format."

The "local content" referred here is a content which can be obtained by the methods other than delivery, and include video data and audio data stored in CD, MD, DVD, and so on, video data and music data, and text data stored as file in HDD of a PC, and so on, data generated by user by recording video and audio, and so on. In the present embodiment, the local content is not encrypted and compressed, but encryption and data compression by encoding may have been carried out. Examples of local content include voice data of PCM stored in music CD.

As shown in FIG. 5, according to the second format, N local contents (content #1, . . . , content #N) 807 are encrypted with N content keys (content key #1, . . . , content key #N) 805, respectively, and stored in the normal area 133 of the semiconductor recording medium 100 as N pieces of encrypted content (encrypted content #1 of the second format, . . . , encrypted content #N of the second form) 807b.

N content keys (content key #1, . . . , content key #N) 805 are encrypted by the media-specific key 801 stored in the special area 131 of the semiconductor recording medium 100, and are stored in the protection area 132 of the semiconductor recording medium 100 as N encrypted content keys (encrypted content key #2, . . . , encrypted content key #N of the second format) 805b.

Figure 6:
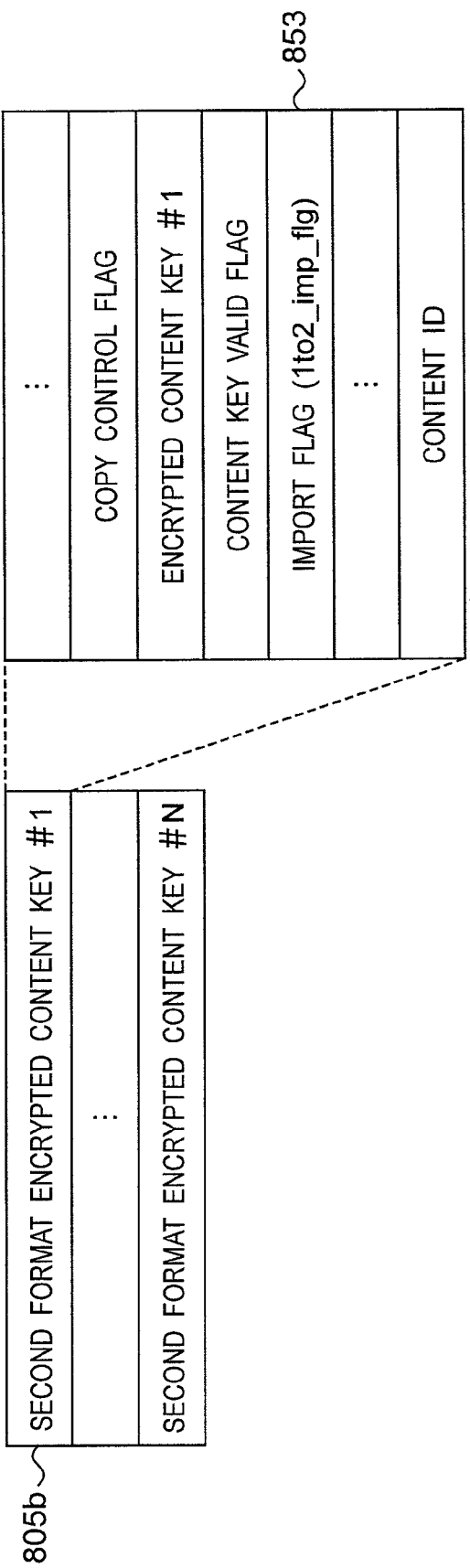
FIG. 6 is a diagram that indicates an example of data structure of an encrypted content key in a second format of an embodiment according to the present invention.

FIG. 6 is a diagram that indicates an example data structure of the encrypted content key 805*b* of the second format. In the example of FIG. 6, the encrypted content key 805*b* of the second format includes the encrypted content key, a copy control flag which stores control information for copying the corresponding content to other recording medium, a content key valid flag that indicates whether the content key is valid or invalid, content ID which is the identifier of corresponding content, and so on.

Furthermore, the encrypted content key 805 of the second format includes an import flag (1to2_imp_flg) 853. The import flag (1to2_imp_flg) 853 in the encrypted content key of the second format indicates the content root and content original storage format similar to the import flag (2to1_imp_flg) 851 in the encrypted content key of the first format.

The import flag (1to2_imp_flg) 853 is set to "OFF" when the content which corresponds to the content key is a content to be originally stored in the second format (that is, local content), and to "ON" when the content to be stored in the first format (that is, delivered content) is converted into the second format.

Consequently, the host device which can read out the content key of the second format can judge whether the content roots is a delivered content or local content by referring to the import flag (1to2_imp_flg) 853.

2.3 Method for Storing Content according to the Present Invention

Figure 7:
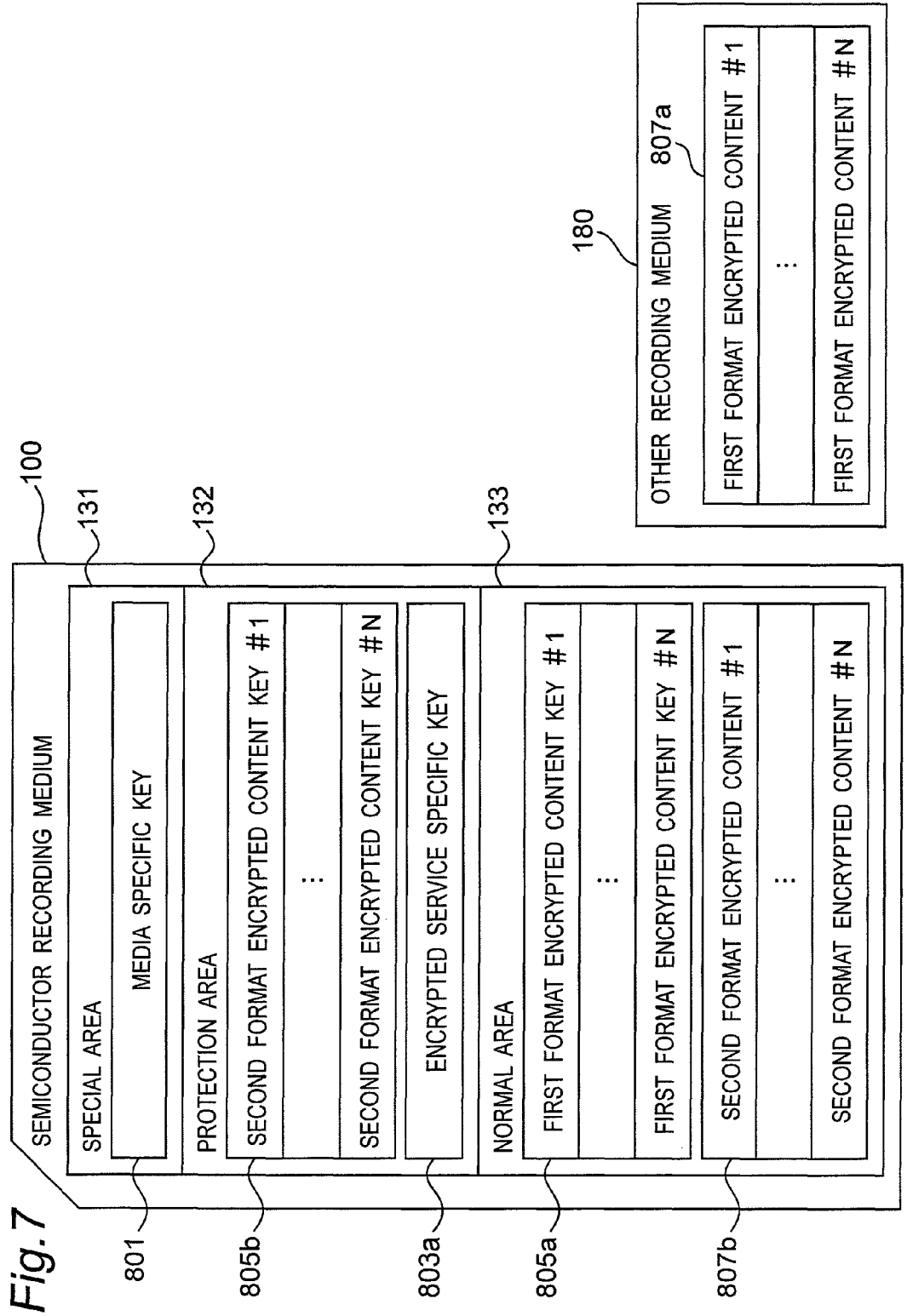
FIG. 7 is a diagram that indicates one example of a storage method of content in the semiconductor recording medium 100 of an embodiment according to the present invention.

FIG. 7 is a diagram that indicates one example of a storage method of content (delivered content or local content) in the semiconductor recording medium 100 according to the present invention.

FIG. 7 shows a storage method combining the storage method of the first format described in FIG. 3 and FIG. 4 with the storage method by the second format described in FIG. 5 and FIG. 6.

Consequently, N contents (content #1, . . . , content #N) are encrypted with N content keys (content key #1, . . . , content key #N), respectively, and are stored in an external recording medium different from the semiconductor recording medium 100 as N encrypted contents (encrypted content #1, . . . , encrypted content #N of the first format) 807*a*. Furthermore, they are also stored in the normal area 133 of the semiconductor recording medium 100 as N encrypted content (encrypted content #1, . . . , encrypted content #N of the second format) 807*b*.

N content keys (content key #1, . . . , content key #N) are encrypted by the service-specific key 803 optionally defined by the delivery service and are stored in the normal area 133 of the semiconductor recording medium 100 as N encrypted content keys (encrypted content #1, . . . , encrypted content #N of the first format) 805*a*. Furthermore, N content keys (content key #1, . . . , content key #N) are encrypted by the media-specific key 801 stored in the special area 131 of the semiconductor recording medium 100 and stored in the protection area 132 of the semiconductor recording medium 100 as N encrypted content keys (encrypted content key #1, . . . , encrypted content key #N of the second format) 805*b*.

The service-specific key 803 is encrypted with the media-specific key 801 which is a key specific to the semiconductor recording medium 100, and stored in the protection area 132 of the semiconductor recording medium 100 as the encrypted service-specific key 803*a*.

In addition, in the present embodiment, the formats (sizes, etc.) of the content keys which are not encrypted before conversion to the first format and the second format respectively (that is, content key of plain text) are identical. Furthermore, the formats (encoding method, file format, etc.) of contents of the plain text before conversion to the first format and the second format are also identical. Furthermore, the methods for encrypting the content of the plain text by the content key of the plain text (for example, DES cipher, C2 cipher, etc.) are identical.

3. Configuration and Operation of Recording Device

Referring now to FIG. 8 to FIG. 11, the configuration and processing sequence of the recording device by the present invention will be described.

3.1 Configuration and Operation of Recording Device for Delivered Content

Figure 8:
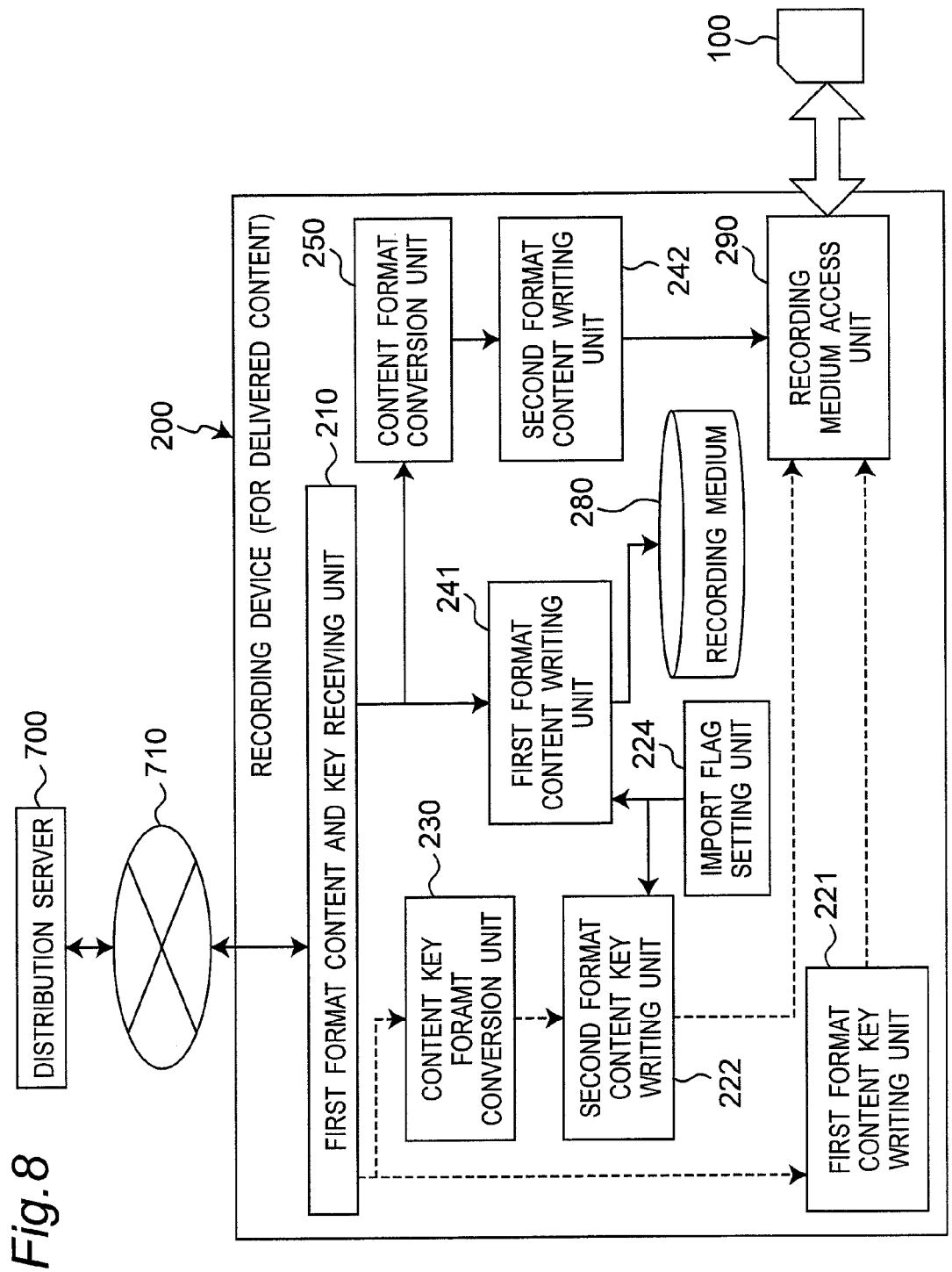
FIG. 8 is a diagram that indicates an example configuration of a recording device 200 for delivered content of an embodiment according to the present invention.

FIG. 8 is a diagram that indicates an example configuration of a recording device for delivered content which records the delivered content in the semiconductor recording medium 100 in the storage method shown in FIG. 7. In FIG. 8, the solid line indicates the flow of content data and the broken line indicates the flow of content key data.

The recording device 200 for delivered content is composed of a first format content and key receiving unit 210, first format content key writing unit 221, second format content key writing unit 222, content key format conversion unit 230, first format content writing unit 241, second format content writing unit 242, import flag setting unit 224, content format conversion unit 250, built-in recording medium 280, and recording medium access unit 290.

The first format content and key receiving unit 210 is connected to a network 710, and receives content and a content key for encrypting the content in the first format from the distribution server 700 connected to the same network 710. The content delivered from the distribution server 700 is encrypted with the content key, while the content key is encrypted with the service-specific key 803 optionally determined in the delivery service.

The first format content key writing unit 221 writes the encrypted content key of the first format in the semiconductor recording medium 100 via the recording medium access unit 290.

The second format content key writing unit 222 writes the encrypted content key of the second format in the semiconductor recording medium 100 via the recording medium access unit 290.

The import flag setting unit 224 sets the import flag (1to2_imp_flg) 853 in the encrypted content key of the second format.

The content key format conversion unit 230 converts the encrypted content key of the first format into the encrypted content key of the second format.

The first format content writing unit 241 writes the encrypted content of the first format into the built-in recording medium 280.

The second format content writing unit 242 writes the encrypted content of the second format into the semiconductor recording medium 100 via the recording medium access unit 290.

The content format conversion unit 250 converts the encrypted content of the first format into the encrypted content of the second format.

The built-in recording medium 280 is the recording medium incorporated into the recording device 200, and is equipped with a function that can read and write arbitrary digital data. The recording medium 280 corresponds to the other recording medium 180 in FIG. 3.

The recording medium access unit 290 is equipped with the semiconductor recording medium 100 to access the semiconductor recording medium 100. The recording medium access unit 290 reads the media-specific key 801 stored in the special region 131 of the semiconductor recording medium 100, and carries out authentication processing necessary to read and write arbitrary digital data stored in the protection area 132.

Figure 9:
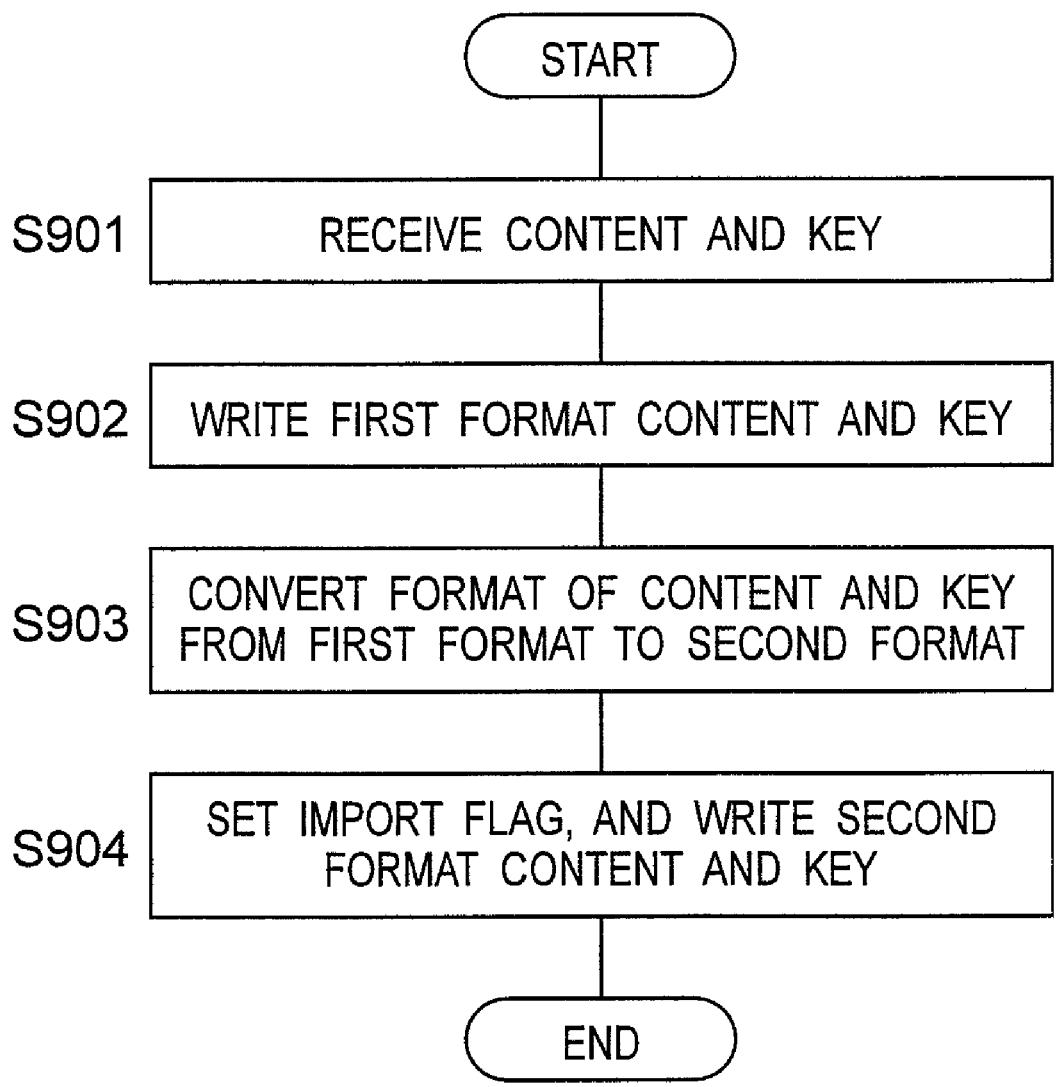
FIG. 9 is a flow chart that indicates one example of a recording sequence of delivered content in an embodiment according to the present invention.

FIG. 9 is a flow chart that indicates an example of an operating sequence for the recording device 200 to store delivered content received in the semiconductor recording medium 100 and built-in recording medium 280.

(Step S901)

The first format content and key receiving unit 210 of the recording device 200 receives content and a content key in the first format from the distribution server 700 via the connected network 710. The content delivered from the distribution server 700 is encrypted with the content key, and the content key is encrypted with the service-specific key optionally determined in delivery service.

It is noted that in the present example, arbitrary values are set in the service ID, copy control flag, movement control flag, content ID, and so on shown in FIG. 4 on reception. In addition, the import flag setting unit 224 sets the import flag (2to1_imp_flg) 851 to "OFF." "OFF" indicates that the content that corresponds to the content key is the content to be originally stored in the first format (that is, delivered content).

(Step S902)

Next, the content key writing unit 221 of the first format stores the received content key in the normal area 133 of the semiconductor recording medium 100 via the recording medium access unit 290. In addition, the first format content writing unit 241 stores the received content in the built-in recording medium 280. It is noted that in place of storing the content in the built-in recording medium 280, it may be stored in the recording medium 100.

(Step S903)

Next, the content key format conversion unit 230 converts the content key from the first format to the second format. This conversion processing carries out the first half processing to generate the content key of plain text from the encrypted content key stored in the first format and the second half processing to generate the encrypted content key from the content key of a plain text to store in the second format.

In the first-half processing, the following processing is carried out. That is, because according to the first format the content key is encrypted with the service-specific key as shown in FIG. 3, the service-specific key is read via the recording medium access unit 290 and the content key is decoded with the service-specific key to generate the content key of plain text. However, since the service-specific key is stored in a state encrypted with the media-specific key in the semiconductor recording medium 100, the encrypted service-specific key and media-specific key should be read in advance to obtain the service-specific key of plain text.

In the second-half processing, the following processing is carried out. That is, because according to the second format, as shown in FIG. 5, the content key is encrypted with the media-specific key, the media-specific key is read via the recording medium access unit 290 and the content key of the plain text is encrypted with the media-specific key.

By the above-mentioned processing, the encrypted content key of the second format can be generated.

It is noted that reading of the media-specific key and reading of the encrypted service specific key are enabled by authenticating mutual validity between the semiconductor recording medium access unit 290 and semiconductor recording medium 100.

In addition, the content format conversion unit 250 converts the content from the first format to the second format. In the present example, in both the first format and second format, the format (sizes, and so on) of the plain text content key is same, and the format of the plain text content (encoding system, file format, etc.) is also same. Further the method for encrypting the content with the content key is also same. Consequently, no processing is required to decode, edit, and re-encrypt the encrypted content of the first format. It is only required to carry out conversion processing of file format of the encrypted content, and so on.

(Step S904) Next, the import flag setting unit 224 of the second format content key writing unit 222 sets the import flag (1to2_imp_flg) 853 of the encrypted content key of the second format generated in Step S903 to "ON." "ON" indicates that the content to be originally stored in the first format (that is, delivered content) is converted into the second format. Thereafter, via the recoding medium access unit 290, the encrypted content key of the second format is stored in the protection area 132 of the semiconductor recording medium 100. Writing to the protection area 132 is enabled by authenticating mutual validity between the recording medium access unit 290 and the semiconductor recording medium 100.

Furthermore, the second format content writing unit 242 stores the encrypted content of the second format generated in Step S903 in the normal area 133 of the semiconductor recording medium 100 via the recording medium access unit 290.

As described above, the recording device 200 can write the delivered content in the semiconductor recording medium 100 in the storage method shown in FIG. 7. In such event, the delivered content is stored in the recording media 280 and 100, respectively, with the import flag (2to1_imp_flg) 851 in the encrypted content key of the first format set to the "OFF" and the import flag (1to2_imp_flg) 853 in the encrypted content key of the second format set to the "ON".

3.2 Configuration and Operation of Recording Device for Local Content

Figure 10:
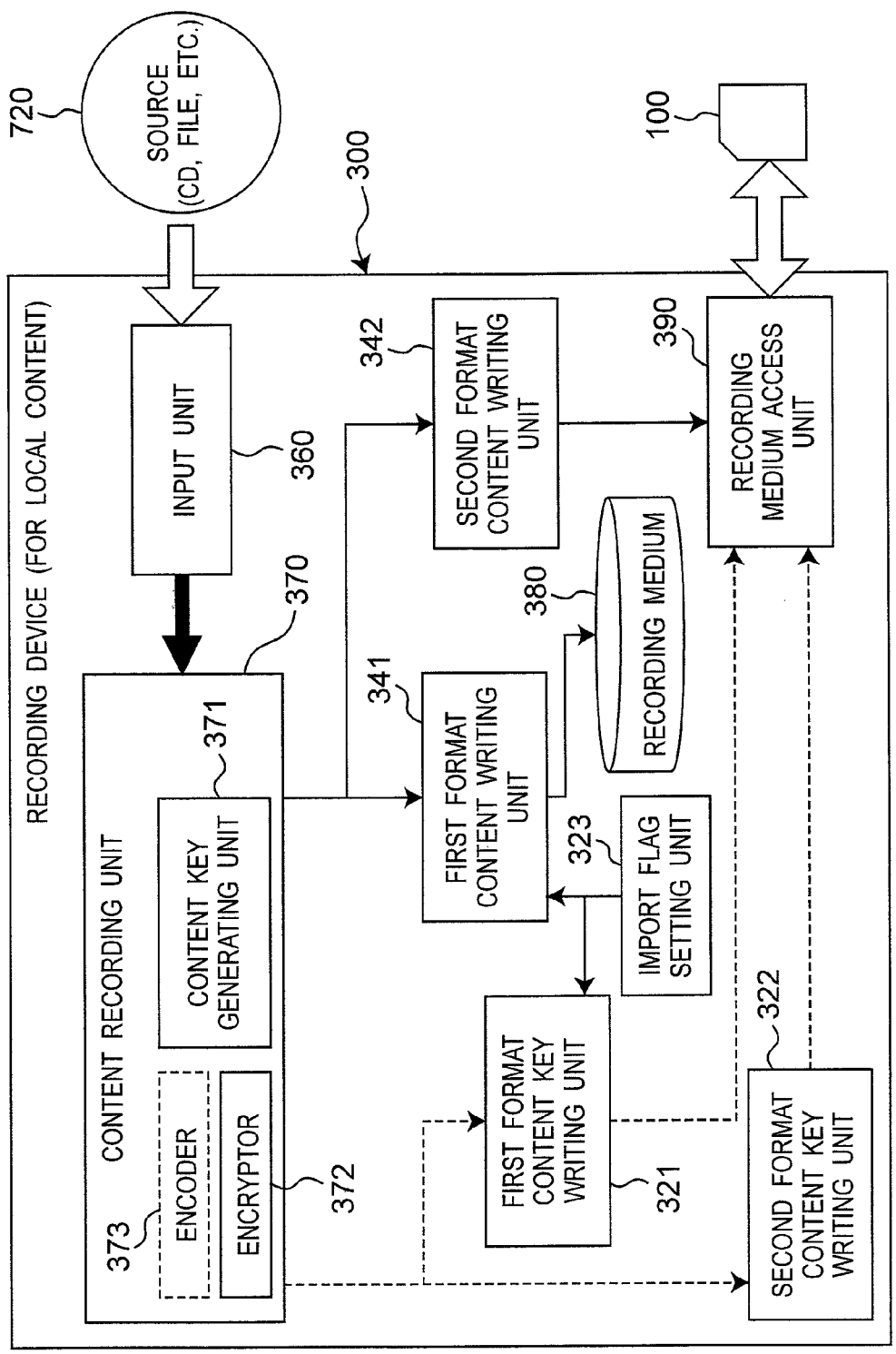
FIG. 10 is a diagram that indicates an example configuration of a recording device 300 for local content of an embodiment according to the present invention.

FIG. 10 is a diagram that indicates an example configuration of a recording device 300 for local content which records the local content in the semiconductor recording medium 100. In FIG. 10, the solid line indicates the flow of content data and the broken line indicates the flow of content key data.

The recording device 300 is composed of a first format content key writing unit 321, second format content key writing unit 322, import flag setting unit 323, a first format content writing unit 341, second format content writing unit 342, input unit 360, content recording unit 370, built-in recording medium 380, and recording medium access unit 390.

The input unit 360 enters local content from a recording medium, and so on. which stores local content as data source.

The content recording unit 370 generates a content key, and encrypts the local content with the content key to generate encrypted content from the local content. The content recording unit 370 includes a content key generating unit 371, encryptor 372, and encoder 373.

The content key generating unit 371 generates a content key used for encrypting the local content inputted from the input unit 360. In this example, the content key generating unit 371 is equipped with a random number generator and generates the content key with random numbers.

The encryptor 372 encrypts the local content with the content key generated by the content key generating unit 371 to generate the encrypted content of the second format.

The encoder 373 encodes and compresses the local content entered in the input unit 360. The encoder 373 is not always required but in the present example, the local content entered is encrypted by the encryptor 372 after compressing by the encoder 373.

The built-in recording medium 380 is a recording medium incorporated in the recording device 300 for local content and has a function to read and write arbitrary digital data.

The recording medium access unit 390 has a function to mount the semiconductor recording medium 100 and accesses the mounted semiconductor recording medium 100. The recording medium access unit 390 carries out authentication processing necessary to read the media-specific key stored in the special area 131, and read and write arbitrary digital data stored in the protection area 132 of the semiconductor recording medium 100.

The first format content key writing unit 321 converts the content key of plain text into encrypted content key of the first format and writes it in the semiconductor recording medium 100 via the recording medium access unit 390.

The import flag setting unit 323 sets the import flag (2to1_imp_flg) 851 in the encrypted content key of the first format to "ON." "ON" indicates that the content which should be stored in the second format (that is, local content) has been converted in the first format.

The second format content key writing unit 322 converts the content key of plain text into the encrypted content key of the second format and writes it in the semiconductor recording medium 100 via the recording medium access unit 390.

The first format content writing unit 341 writes the encrypted content into the built-in recording medium 380 in the first format. The encrypted content may be written in the recording medium 100 in the first format.

The second format content writing unit 342 writes the encrypted content in the semiconductor recording medium 100 via the recording media access unit 390 in the second format.

Figure 11:
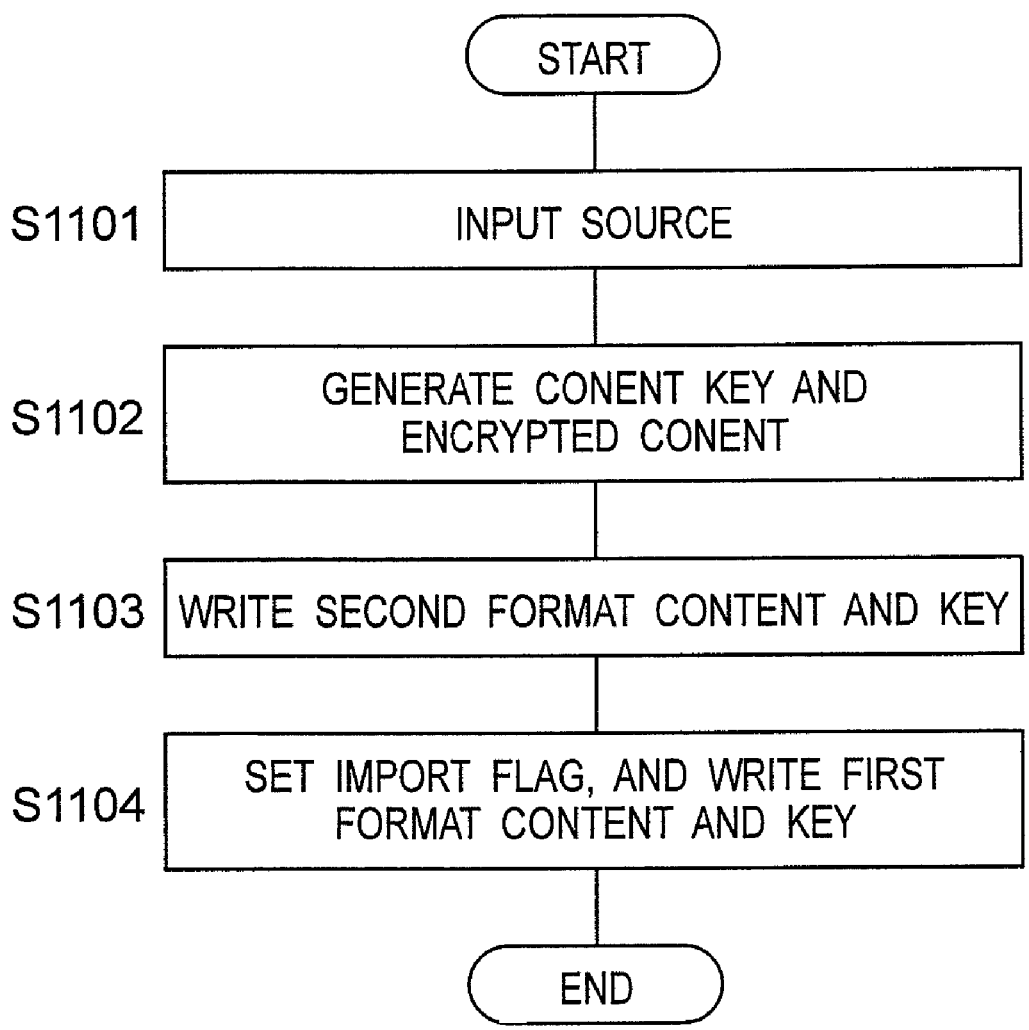
FIG. 11 is a flow chart which indicates one example of a recording sequence of local content of an embodiment according to the present invention.

FIG. 11 is a flow chart that indicates an example operation sequence of the recording device 300 for local content for storing local content obtained via the input unit 360 in the semiconductor recording medium 100 and the built-in recording medium 380.

(Step S1101)

First of all, the input unit 360 of the recording device 300 obtains local content by reading from the recording medium 720 which stores data source and inputting from input devices such as cameras and microphones. The obtained local content is delivered to the content recording unit 370.

(Step S1102)

Then, the content recording unit 370 encodes and compresses the local content entered, through the encoder 373. Furthermore, the content key generating unit 371 generates the content key. The encryptor 372 encrypts the encoded local content with the content key to generate encrypted content.

(Step S1103)

Then, the second format content key writing unit 322 encrypts the content key with the media-specific key of the semiconductor recording medium 100 to generate the encrypted content key, and stores it in the second format in the protection area 132 of the semiconductor recording medium 100 via the recording medium access unit 390. Readout of the media-specific key and writing in the protection area are enabled by authenticating mutual validity between the recording medium access unit 390 and the semiconductor recording medium 100.

It is noted that in the present example, arbitrary values are set to the copy control flag, content key valid flag, content ID, and so on shown in FIG. 6. The fixed value "OFF" is set to the import flag (1to2_imp_flg) 853. "OFF" indicates that the content that corresponds to the content key is the content (local content) to be originally stored in the second format.

In addition, the second format content writing unit 342 stores in the second format the encrypted content in the normal area 133 of the semiconductor recording medium 100 via the recording medium access unit 390.

(Step S1104)

Next, the first format content key writing unit 321 encrypts the content key with the service-specific key stored in the semiconductor recording medium 100, generates the encrypted content key, and stores in the protection area 132 of the semiconductor recording medium 100 via the recording medium access unit 390. However, since the service-specific key is stored in the semiconductor recording medium 100 in the state encrypted with the media-specific key, the encrypted service-specific key and media-specific key should be read out and the service-specific key of plain text should be obtained. Readout of the media-specific key and reading and writing of the protection area are enabled by authenticating mutual validity between the recording media access unit 390 and the semiconductor recording medium 100.

It is noted that in the present example, arbitrary values are set to the service ID, copy control flag, movement control flag, content ID, and so on. The import flag (2to1_imp_flg) 851 is constantly set to "ON" by the import flag setting unit 323. "ON" indicates that the content to be stored in the second format (local content) has been converted in the first format.

In addition, the first format content writing unit 341 stores in the first format the encrypted content to the normal area 133 of the semiconductor recording medium 100 via the recording medium access unit 390.

As described above, the recording unit 300 can write the local content, in the first format, to the semiconductor recording medium 100 in the storage method shown in FIG. 7. In such event, the local content is stored in the recording media 380 and 100, respectively, with the import flag (2to1_imp_flg) 851 in the encrypted content key of the first format set to "ON" and the import flag (1to2_imp_flg) 853 in the encrypted content key of the second format set to "OFF."

4. Configuration and Operation of Reproducing Device

Referring now to FIG. 12 through FIG. 15, discussion will be made on the configuration of reproducing devices according to the present invention and on the processing sequence of the reproducing devices playing back the semiconductor recording medium 100 according to the present invention.

4.1 Configuration and Operation of Reproducing Device for Delivered Content

Figure 12:
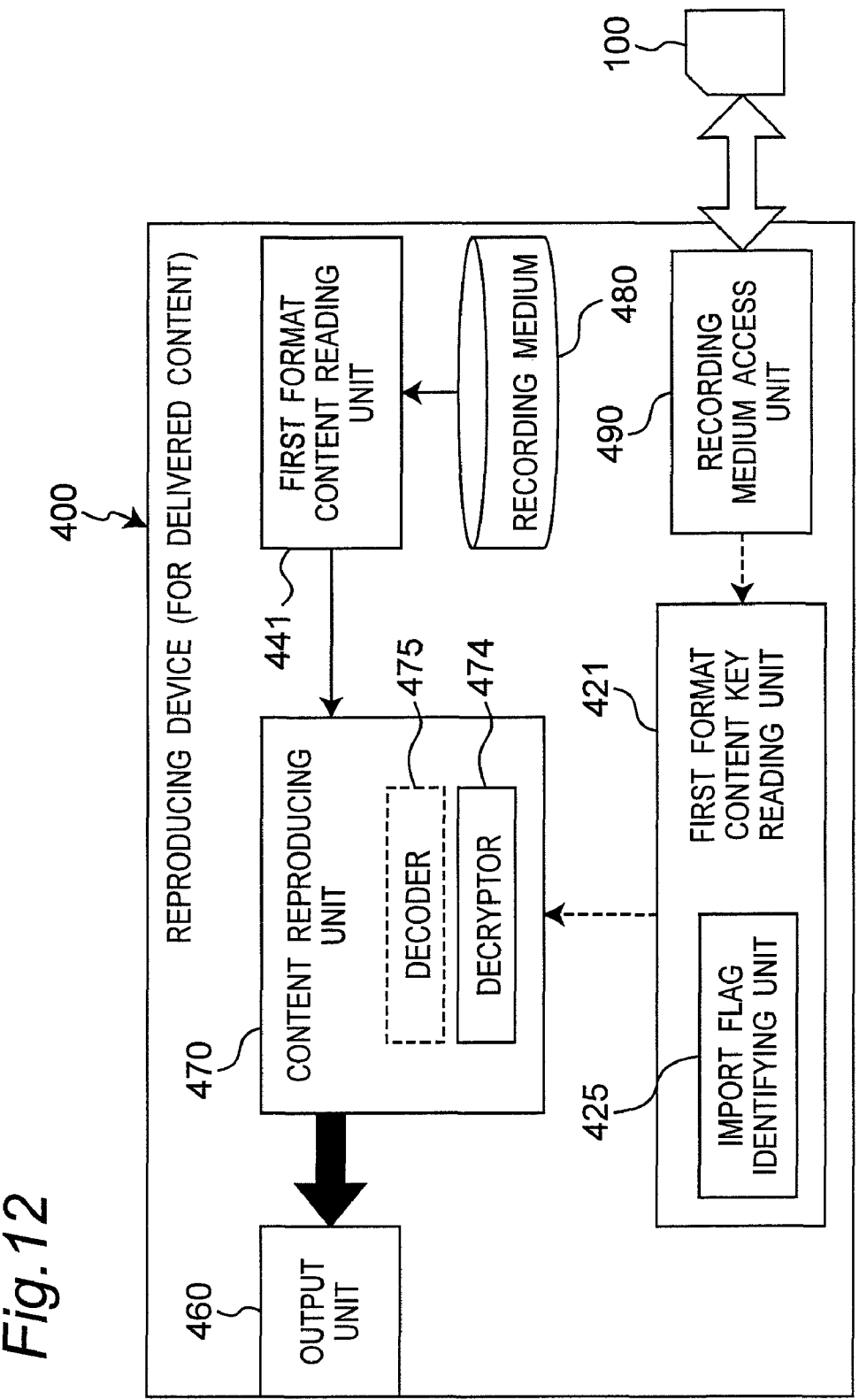
FIG. 12 is a diagram that indicates an example configuration of a reproducing device 400 for delivered content of an embodiment according to the present invention.

FIG. 12 is a diagram that indicates an example configuration of reproducing devices for delivered content. In FIG. 12, the solid line indicates the flow of content data, and the broken line indicates the flow of the content key data.

A conventional reproducing device for delivered content is able to reproduce the content stored in the first format. However, the reproducing device 400 for delivered content shown in FIG. 12 according to the present invention is characterized in that the reproducing device 400 has an import flag identifying unit 425 and can change over operations of the content reproducing unit 470 by referring to the value of the import flag (2to1_imp_flg). The details of the reproducing device will be described below.

The reproducing device 400 is composed of a first format content key reading unit 421, first format content reading unit 441, output unit 460, content reproducing unit 470, built-in recording medium 480, and recording medium access unit 490.

The first format content key reading unit 421 reads the encrypted content key of the first format stored in the semiconductor recording medium 100 via the recording medium access unit 490, decodes it, and then delivers the content key of plain text to the content reproducing unit 470. The first format content key reading unit 421 is equipped with an import flag identifying unit 425.

The import flag identifying unit 425 refers to the value of the import flag (2to1_imp_flg) 851 in the encrypted content key of the first format and notifies the value to the content reproducing unit 470.

The first format content reading unit 441 reads the encrypted content of the first format stored in the built-in recording medium 480 and delivers the encrypted content to the content reproducing unit 470.

The output unit 460 outputs the content data reproduced by the content reproducing unit 470. When the content data is image data, the output unit is a display and so on, and when it is audio data, it is a speaker, and so on. In addition, when a display or a speaker located outside of the reproducing device 400 for delivered content is used, the output unit is an output terminal of AV-OUT, and so on.

The content reproducing unit 470 decodes the encrypted content received from the first format content reading unit 441 with the content key received from the first format content key reading unit 421, and reproduces the content by carrying out decompression processing. The content reproducing unit 470 has a decryptor 474 and decoder 475.

The decryptor 474 carries out processing to decode the encrypted content with the content key. When the content decoded by decryptor 474 is compressed, the decoder 475 carries out decompression processing to the content to return it back to the state before compression. It is noted that the decoder 475 is not always required, when the content is not compressed.

The built-in recording medium 480 is a recording medium incorporated in the reproducing device 400 for delivered content, and is equipped with a function to read and write arbitrary digital data. It is assumed below that the encrypted content is stored in the first format.

The recording medium access unit 490 mounts the semiconductor recording medium 100 and accesses the mounted semiconductor recording medium 100. The recording medium access unit 490 carries out readout of the media-specific key stored in the special area 131 of the semiconductor recording medium 100, and carries out authentication processing necessary for reading arbitrary digital data stored in the protection area 132.

Figure 13:
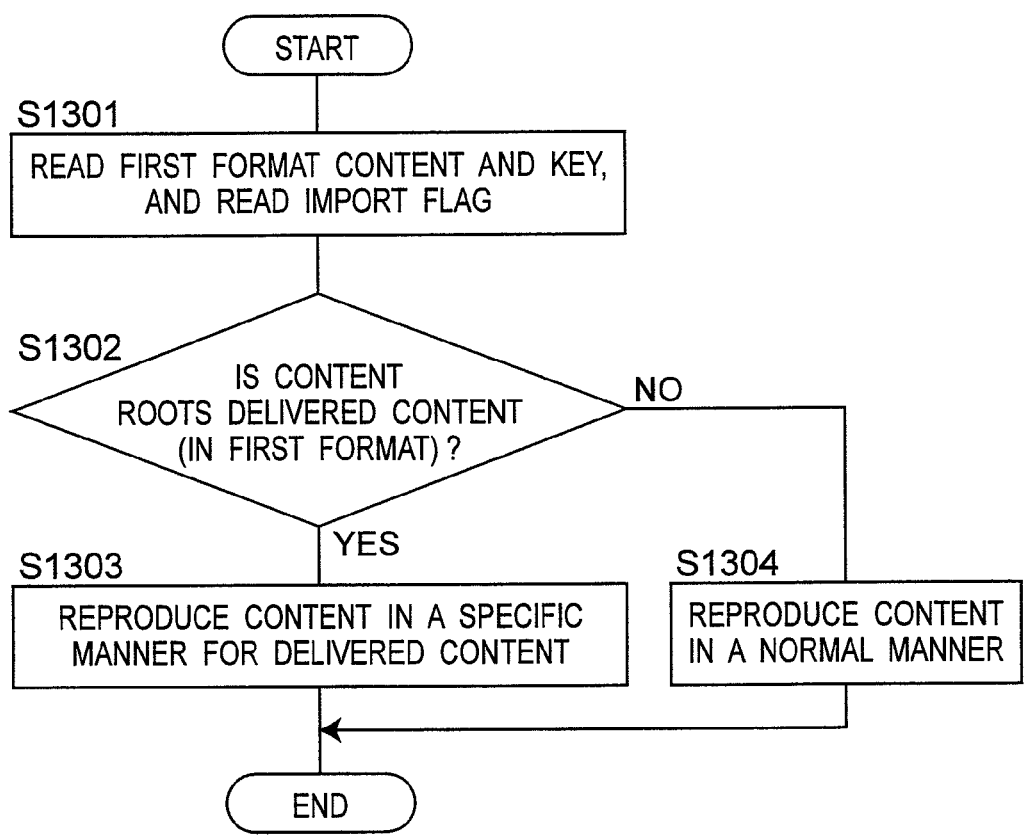
FIG. 13 is a flow chart that indicates one example of a playback sequence of the content stored in the first format of the embodiment according to the present invention.

FIG. 13 is a flow chart that indicates an example of an operation sequence of the reproducing device 400 for reproducing the content stored, in the first format, in the semiconductor recording medium 100 and the built-in recording medium 480.

(Step S1301)

First of all, the first format content key reading unit 421 of the reproducing device 400 reads the encrypted content key of the first format via the recording medium access unit 490. Because according to the first format, the content key is encrypted with the service-specific key as shown in FIG. 3, the service-specific key is read out via the recording medium access unit 490 and decoded with the service-specific key to generate the content key of plain text. It is noted that, since the service-specific key is stored in the semiconductor recording medium 100 in the state encrypted with the media-specific key, the encrypted service specific key and the media specific key should be read out to obtain the service specific key of plain text.

The content key obtained in this way is delivered to the content reproducing unit 470.

It is noted that readout of the media specific key and readout of the encrypted service specific key are enabled by authenticating the mutual validity between the recording medium access unit 490 and the semiconductor recording medium 100.

In addition, the import flag identifying unit 425 refers to the import flag (2to1_imp_flg) 851 in the encrypted content key of the first format and notifies the value to the content reproducing unit 470.

In addition, the first format content reading unit 441 reads the encrypted content of the first format from the built-in recording medium 480, and sends the encrypted content to the content reproducing unit 470.

(Step S1302)

The content reproducing unit 470 executes processing of step S1303 when the value of the import flag (2to1_imp_flg) 851 notified from the import flag identifying unit 425 is "OFF." It in the case of "ON," the content reproducing unit 470 carries out processing of step S1304. That is, in the event that the content is originally the delivered content, the content reproducing unit 470 carries out processing specific to the delivered content (S1303) and if not, carries out regular playback (S1304).

(Step S1303)

In the content reproducing unit 470, the decryptor 474 decodes the encrypted content obtained from the first format content reading unit 441 using the content key obtained from the first format content key reading unit 421. Furthermore, the decryptor carries out decompression processing of the content decoded by the decoder 475 and sends it to the output unit 460, thereby, reproducing the content.

In such event, the content reproducing unit 470 carries out reproduction processing specific to the delivered content. The reproduction processing specific to the delivered content includes processing such as prohibiting of fast-forward or fast-rewind during reproduction, always displaying of advertisements of service provider for content distribution before reproduction, and so on. This is because that the delivered content may be sometimes subject to such restrictions on reproduction in view of commercial purpose of the delivered content.

(Step S1304)

In the content reproducing unit 470, the decryptor 474 decodes the encrypted content obtained from the first format content reading unit 441 using the content key obtained from the first format content key reading unit 421. Furthermore, the decryptor 474 decompresses the content decoded by the decoder 475 and sends it to the output unit 460 to reproduce the content.

In such event, the content reproducing unit 470 does not execute the reproduction processing specific to the delivered content but executes ordinary reproduction processing.

As described above, the reproducing device 400 for the delivered content can reproduce the content of the first format using the storage specifications shown in FIGS. 3 and 4, or FIG. 7.

Furthermore, the reproducing device 400 can judge the content roots of the content to be played back, that is, whether it is a content which should be originally stored in the first format (delivered content) or a content which should be stored in the second format (local content) but has been converted into the first format, and can change over the playback method in accordance with the judgment result.

4.2 Configuration and Operation of Reproducing Device for Local Content

Figure 14:
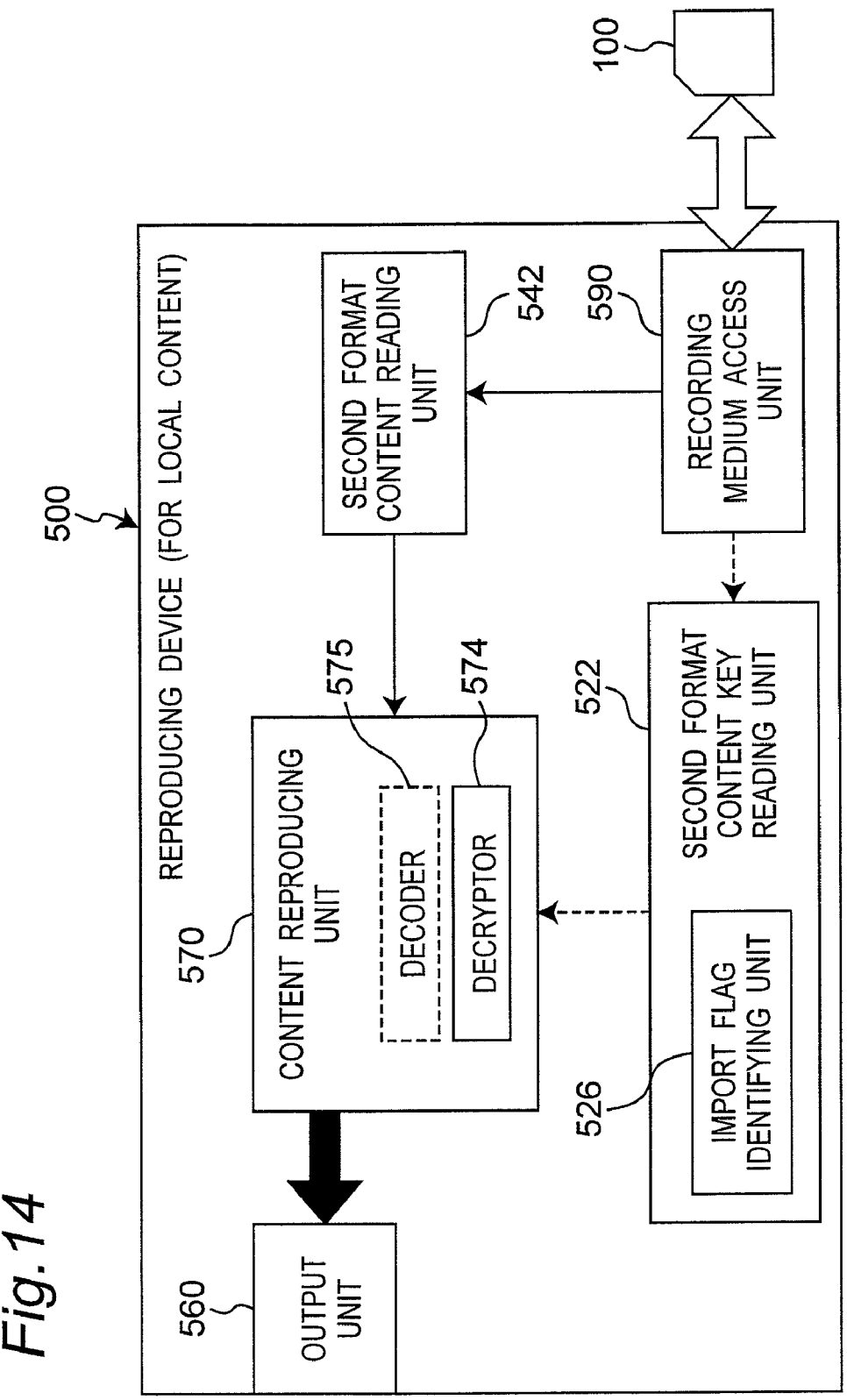
FIG. 14 is a diagram that indicates an example configuration of a reproducing device 500 for local content of the embodiment according to the present invention.

FIG. 14 is a diagram that indicates an example configuration of the reproducing device for local content. In FIG. 14, the solid line indicates the flow of content data and the broken line indicates the flow of the content key data.

A conventional reproducing device for local content can reproduce content stored in the second format. The reproducing device 500 for local content according to the present invention is characterized in that it has an import flag identifying unit 526, and can changeover operations of the content reproducing unit 570 by referring to the value of the import flag (1to2_imp_flg) 852. The details of it will be described below.

The reproducing device 500 is composed of a second format content key reading unit 522, second format content reading unit 542, output unit 560, content reproducing unit 570, and recording medium access unit 590.

The second format content key reading unit 522 reads the encrypted content key of the second format stored in the semiconductor recording medium 100 via the recording medium access unit 590, decodes it, and sends the content key of plain text to the content reproducing unit 570. The second format content key reading unit 522 is equipped with the import flag identifying unit 526.

The import flag identifying unit 526 refers to the value of the import flag (1to2_imp_flg) 853 in the encrypted content key of the second format and notifies the value to the content reproducing unit 570.

The second format content reading unit 542 reads the encrypted content of the second format stored in the semiconductor recording medium 100 via the recording medium access unit 590 and sends the encrypted content to the content reproducing unit 570.

The output unit 560 outputs the content data reproduced by the content reproducing unit 570. When the content data is video data, the output unit is a display, and so on, and when audio data, it is a speaker, and so on. In addition, when a display or a speaker located outside of the reproducing device 500 for delivered content is used, the output unit is an output terminal of AV-OUT, and so on.

The content reproducing unit 570 decodes the encrypted content received from the second format content reading unit 542 with the content key received from the second format content key reading unit 522, and decompresses it to reproduce the content. The content reproducing unit 570 has a decryptor 574 and decoder 575.

The decryptor 574 decodes the encrypted content with the content key. When the content decoded by the decryptor 574 is compressed, the decoder 575 decompresses the content to return it to the state before compression. It is noted that the decoder 575 may not be required when the content is not compressed.

The recording medium access unit 590 mounts the semiconductor recording medium 100 and accesses the mounted semiconductor recording medium 100. The recording medium access unit 590 carries out readout of the media-specific key stored in the special area 131 of the semiconductor recording medium 100 and carries out authentication processing necessary for reading and writing arbitrary digital data stored in the protection area 132.

Figure 15:
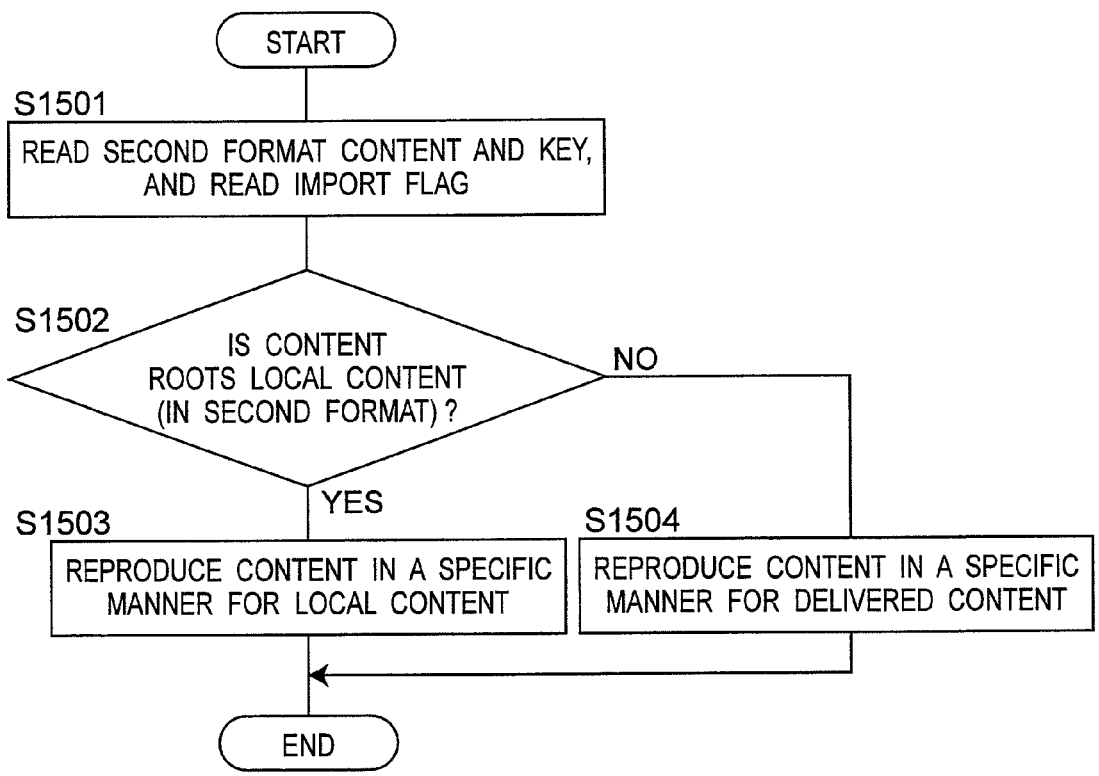
FIG. 15 is a flow chart which shows one example of a playback sequence of the content stored in the second format of an embodiment according to the present invention.

FIG. 15 is a flow chart that indicates an example of an operation sequence of the reproducing device 500 for playing back the content stored in the second format to the semiconductor recording medium 100.

(Step S1501)

First of all, the second format content key reading unit 522 of the reproducing device 500 reads the encrypted content key of the second format via the recording medium access unit 590. Because according to the second format the content key is encrypted with the service-specific key as shown in FIG. 5, the media-specific key is read out via the recording medium access unit 590 and the content key is decoded with the media-specific key.

The content key obtained in this way is sent to the content reproducing unit 570.

It is noted that readout of the media specific key is enabled by authenticating the mutual validity between the recording medium access unit 590 and the semiconductor recording medium 100.

In addition, the import flag identifying unit 526 refers to the import flag (1to2_imp_flg) 853 for the encrypted content key of the second format and notifies the value of the encrypted content key of the second format to the content reproducing unit 570.

In addition, the second format content reading unit 542 reads the encrypted content of the second format from the semiconductor recording medium 100 via the recording medium access unit 590 and sends the encrypted content to the content reproducing unit 570.

(Step S1502)

The content reproducing unit 570 executes processing of step S1503 when the value of the import flag (1to2_imp_flg) 853 notified from the import flag identifying unit 526 is "OFF." When "ON," the content reproducing unit 570 carries out processing of step S1504. That is, when the content is originally the local content, the content reproducing unit 570 carries out processing specific to the local content (S1503). When the original content is the delivered content, the content reproducing unit 570 carries out processing specific to the delivered content (S1504).

(Step S1503)

In the content reproducing unit 570, the decryptor 574 decodes the encrypted content obtained from the second format content reading unit 542 using the content key obtained from the second format content key reading unit 522. Furthermore, the decryptor decompresses the content decoded by the decoder 575 and sends it to the output unit 560 to carry out playback.

In such event, the content reproducing unit 570 carries out reproduction processing specific to the local content. Reproduction processing specific to the local content includes processing such as permitting of fast-forward or fast-rewind during reproduction, or permitting double speed playback, slow speed playback, and so on.

(Step S1504)

In the content reproducing unit 570, the decryptor 574 decodes the encrypted content obtained from the second format content reading unit 542 using the content key obtained from the second format content key reading unit 522. Furthermore, the decoder 575 decompresses the decoded content and sends it to the output unit 560.

In such event, the content reproducing unit 570 does not execute the reproduction processing specific to the local content but execute the content-specific reproduction processing.

As described above, the reproducing device 500 for the local content can reproduce the content of the second format using the storage specifications shown in FIGS. 5 and 6, or FIG. 7.

Furthermore, the reproducing device 500 can judge the content roots, that is, whether the content to be played back is a content which should be originally stored in the second format (local content) or a content which should be stored in the first format (delivered content) but has been converted into the second format, and can change over the playback method in accordance with the judgment result.

5. Configuration and Operation of Content Editing Device

Referring now to FIG. 16 through FIG. 20, the configuration and processing sequence of the editing device according to the present invention.

Figure 16:
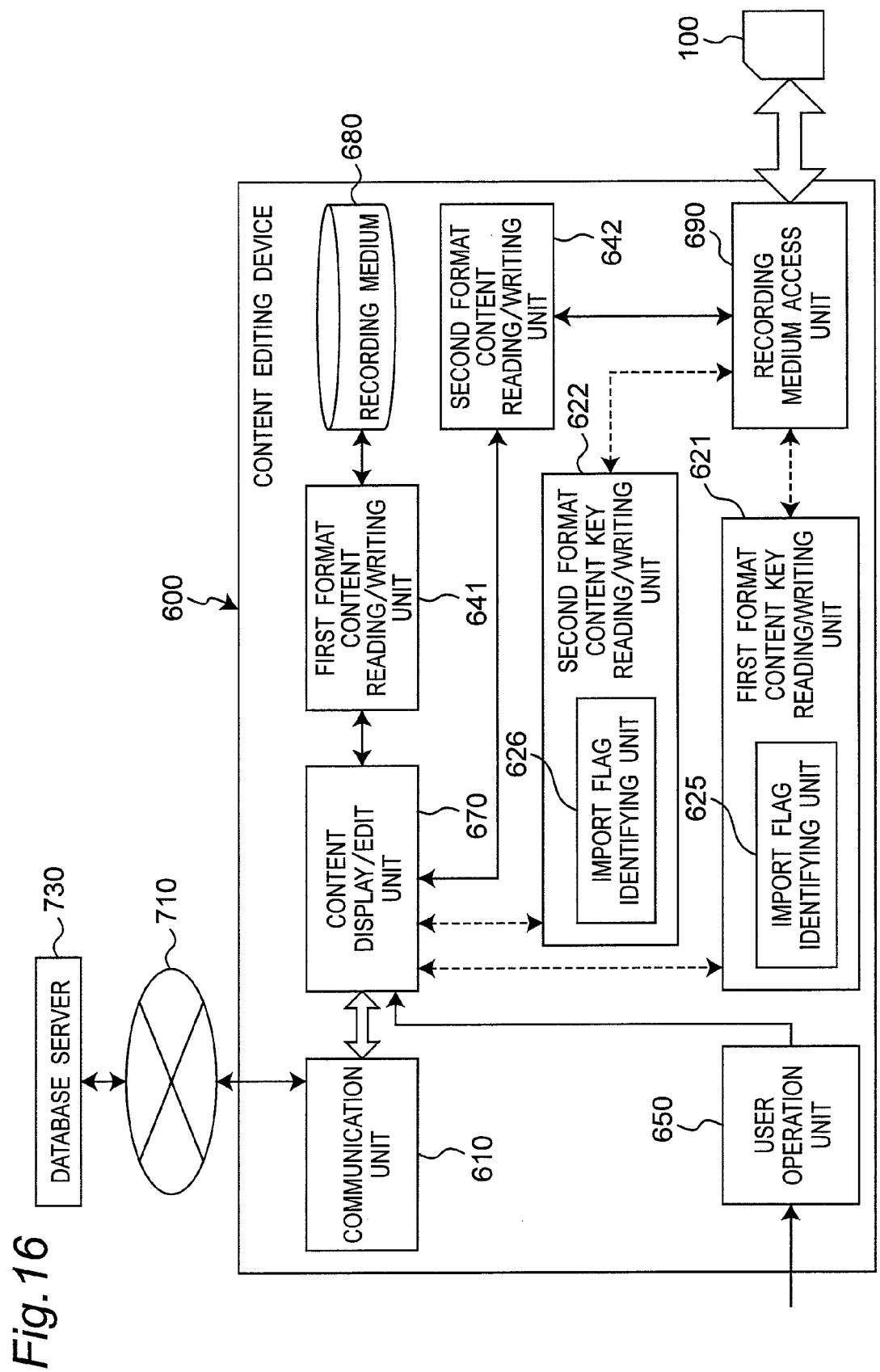
FIG. 16 is a diagram that indicates an example configuration of a content editing device 600 of an embodiment according to the present invention.

FIG. 16 is a diagram that indicates an example configuration of the content editing device 600. In FIG. 16, the solid line indicates the flow of content data, the broken line indicates the flow of the content key data, and the double line indicates the flow of the other data.

The content editing device 600 is characterized in that it has an import flag identifying units 625 and 626, and can change over operations of the content display/edit unit 670 by referring to the value of the import flag (2to1_imp_flg and 1to2_imp_flg). The details of it will be described below.

The content editing device 600 has a communication unit 610, first format content key reading/writing unit 621, second format content key reading/writing unit 622, first format content reading/writing unit 641, second format content reading/writing unit 642, user operation unit 650, content display/edit unit 670, built-in recording medium 680, and recording medium access unit 690.

The communication unit 610 is connected with the network 710, and obtains information on the content (content price, content popularity ranking, content information on the same artist, and so on) from a database server 730 connected in the same network. In the present embodiment, the information concerning content includes information which is updated in real time.

The first format content key reading/writing unit 621 accesses the semiconductor recording medium 100 via the recording medium access unit 690, and reads and writes the encrypted content key of the first format. The first format content key reading/writing unit 621 is equipped with an import flag identifying unit 625.

The import flag identifying unit 625 refers to the import flag (2to1_imp_flg) 851 in the encrypted content key of the first format and notifies the flag value to the content display/edit unit 670.

The second format content key reading/writing unit 622 accesses the semiconductor recording medium 100 via the recording medium access unit 690, and reads and writes the encrypted content key of the second format. The second format content key reading/writing unit 622 is equipped with an import flag identifying unit 626.

The import flag identifying unit 626 refers to the import flag (1to2_imp_flg) 853 in the encrypted content key of the second format, and notifies the flag value to the content display/edit unit 670.

The first format content reading/writing unit 641 has functions to access the built-in recording medium 680 and read and write the encrypted content of the first format.

The content read/write unit 642 of the second format accesses the semiconductor recording medium 100 via the recording medium access unit 690, and reads and writes the encrypted content of the second format.

The user operation unit 650 obtains information on operation by the user.

The content display/edit unit 670 displays and edits the content. In the present example, it is at least equipped with a screen to carry out content display. It may be equipped with the above-mentioned encoder, decoder, encryptor, decryptor, content key generating unit, and so on, for editing.

The built-in recording medium 680 is a recording medium incorporated in the content editing device 600 and can read and write arbitrary digital data. In the built-in recording medium 680, the encrypted content is stored in the first format.

The recording medium access unit 690 mounts the semiconductor recording medium 100 and access the mounted semiconductor recording medium 100. The recording medium access unit 690 carries out authentication processing necessary for reading the media specific key stored in the special area 131 of the semiconductor recording medium 100 and for reading and writing arbitrary digital data stored in the protection area 132.

Figure 17:
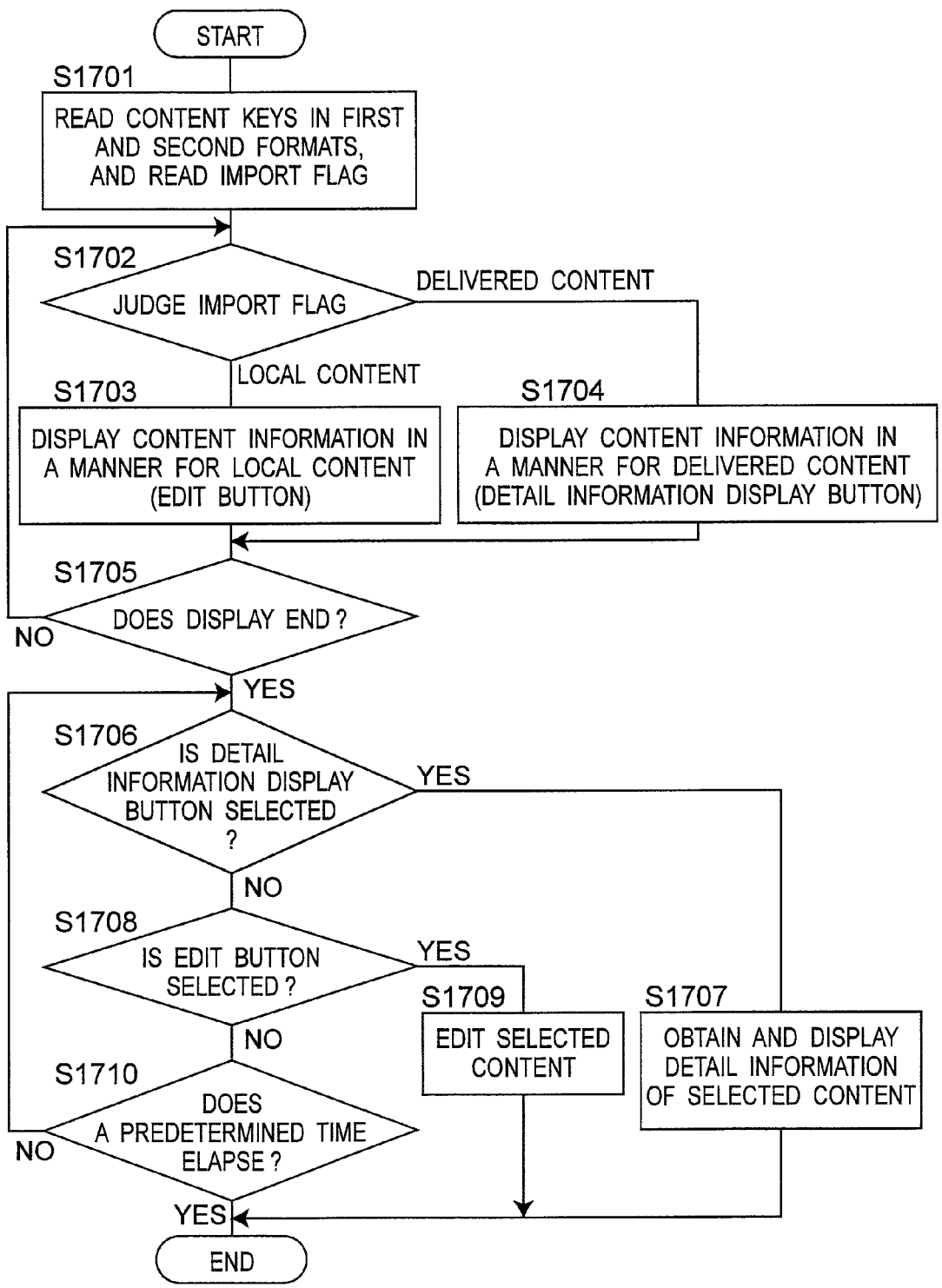
FIG. 17 is a diagram that indicates one example of a display/edit sequence of content of the embodiment according to the present invention.

FIG. 17 is a flow chart that indicates an example operation sequence of the content editing device 600 for displaying and editing content stored in the first format and the second format to the semiconductor recording medium 100 and the built-in recording medium 680.

(Step S1701)

First of all, the first format content key reading/writing unit 621 of the content editing device 600 reads the encrypted content key of the first format via the recording medium access unit 690, and notifies the read information to the content display/edit unit 670.

In such event, the import flag identifying unit 625 refers to the import flag (2to1_imp_flg) 851 in the encrypted content key of the first format and notifies the flag value to the content display/edit unit 670.

In addition, the second format content key reading/writing unit 622 reads the encrypted content key of the second format via the recording medium access unit 690 and notifies the read information to the content display/edit unit 670. In such event, the import flag identifying unit 626 refers to the import flag (1to2_imp_flg) 853 in the encrypted content key of the second format and notifies the flag value to the content display/edit unit 670.

(Step S1702)

The content display/edit unit 670 judges whether each content is a content which should be originally stored in the first format (delivered content) or a content which should be originally stored in the second format (local content) on the basis of the information of import flags (2to1_imp_flg, 1to2_imp_flg) 851 and 853 received in Step S1701. In the former case, the processing advances to Step S1704, and in the latter case, it advances to Step S1703.

It is noted that this processing may be decided by referring to either one of the two import flags (2to1_imp_flg, 1to2_imp_flg).

In addition, it is not illustrated, but if the two import flags contradict, error processing is carried out.

(Step S1703)

The content display/edit unit 670 displays the content information in a display method for local content. For example, the display method for local content provides a display with a button to start editing (hereinafter called the "edit button") together with general information on the content.

(Step S1704)

The content display/edit unit 670 displays the content information in a display method for delivered content. For example, the display method for delivered content provides a display with a button to display detail information (hereinafter called the "detail information display button") together with general information on content.

(Step S1705)

When display of one screen of each content is completed, the content display/edit unit 670 enters a state for waiting user's input from the user input unit 650 and the processing advances to S1706. When display of one screen is not completed, the processing returns to Step S1702.

FIG. 18 is a diagram that indicates one example of the display by the content display/edit unit 670 when display of one screen is completed. In FIG. 18, "Song_AAA" is displayed in the display method for local content with an edit button 831 displayed. "Song_BBB" is displayed in the display method for delivered content with a detail information display button 833 displayed.

(Step S1706)

When the user selects the detail information display button 833 through the user operation unit 650, the processing advances to Step S1707, otherwise, the processing advances to Step S1708.

(Step S1707)

The content display/edit unit 670 acquires detail information on the selected content from the database server 730 via the communication unit 610 and displays the detail information for a specified time. FIG. 19 shows the display example of the content display/edit unit 670 in such event. Thereafter, this processing is completed.

(Step S1708)

When the user selects the edit button 831 through the user operation unit 650, the processing advances to Step S1709. Otherwise, the processing advances to Step S1710.

(Step S1709)

Figure 20:
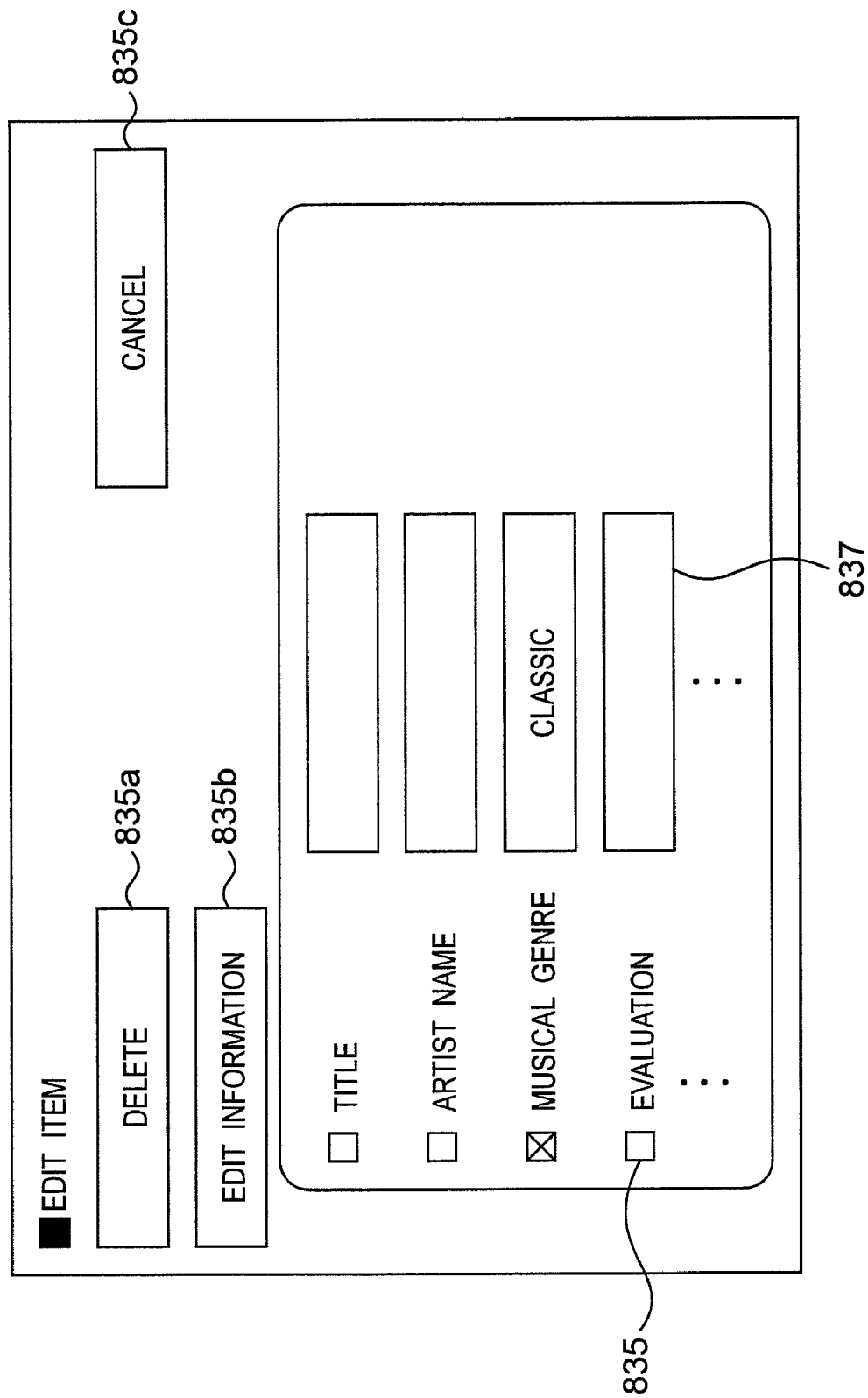
FIG. 20 is a diagram that indicates one example of a display screen for editing the content with the content display/edit unit 670 of the embodiment according to the present invention.

The content display/edit unit 670 displays a screen to edit the selected content. FIG. 20 shows a display example of the content display/edit unit 670. In the example of FIG. 20, there displayed are a delete button 835a for designating deletion of content, an information edit button 835b for designating edition of information concerning the content such as title, artist name, genre, evaluation, and so on, a checklist 835 for selecting items to be edited concerning edition of information, an input box 837 for entering content of edition, a cancel button 835c that designates cancellation of edition processing, and so on.

Thereafter, the user designates the processing item through the user input unit 650, and the content display/edit unit 670 carries out edition processing and then completes the present processing.

(Step S1710)

When a specified time has passed since the display of one screen is completed in Step S1705, the content display/edit unit 670 finishes processing. If not passed yet, the content display/edit unit 670 returns to Step S1706.

As described above, the content editing device 600 is able to display and edit the content using the storage specifications shown in FIG. 7.

Furthermore, the content editing device 600 judges the content roots of the content to be displayed, that is, whether the content to be displayed is a content which should be originally stored in the first format (delivered content) or a content which should be stored in the second format (local content), and can change over the display method in accordance with the judgment result.

Furthermore, it can change over the display between the display for editing and the display for detail information display, in accordance with the judgment result.

The present invention is particularly effective to a semiconductor recording medium with copyright protection function used for storing both delivered content and local content as well as a host device of the semiconductor recording medium.

6. Modifications

Although the present invention has been described on the basis of the specific embodiments mentioned above, it is understood that the present invention shall not be limited to the above-mentioned embodiments. It is to be understood that various modifications (changes and variations) may be made without departing from the spirit or scope of the present invention. For example, following modifications could be assumed.

(1) In the present embodiment, description was made on the semiconductor recording medium. However, the concept of the present invention can be applied to any types of a recording medium as far as the recording medium stores the same content in multiple formats.

(2) In the present embodiment, a FAT file system is used in the searched information storage area. However FAT32, UDF, and other file systems may be used. Otherwise, size, record address, and so on may be managed without using any file system.

(3) In the present embodiment, an area for storing the content key is the normal area 133 in the first format and the protection area 132 in the second format. However the present invention shall not be limited to this. The content key storage does not depend on format. Similarly, an area for storing the encrypted content described above is shown merely as an example, and shall not be limited to the above disclosure. For example, the encrypted content in the first format may be stored in the normal area 133 of the semiconductor recording medium 100.

(4) In the present embodiment, as a key to encrypt the content key, the service-specific key is used in the first format, and the media-specific key is used in the second format. However the key to encrypt the content is not limited to this. In the case that security can be ensured by any other method than encryption, the content key of plain text may not be encrypted and be stored as it is.

(5) In the present embodiment, the first format primarily directed to the delivered content and the second format primarily directed to local content are shown, however the format shall not be limited to these two. The concept of the present invention is effective when the content is stored in multiple different formats.

Furthermore, the import flag may be set to "OFF" when the content is stored in an original format and to "ON" when the content is converted from the original format and stored. Alternatively, multiple import flags may be equipped in accordance with the number of formats of input sources.

(6) In the present embodiment, the recording device 200 for delivered content, the recording device 300 for local content, reproducing device 400 for delivered content, and content editing device 600 include the built-in recording media 280, 380, 480, and 680, respectively. Each of the built-in recording media may be detachable. For example, they may be optical disks such as DVD-RAM.

(7) The present embodiment describes the example to obtain the delivered content of the first format from the distribution server via a network. However a case in which delivered content of the first format is stored in CD-ROM, DVD-ROM, and other recording media and delivered could be assumed.

In this case, the first format content and key receiving unit 210 of the recording device 200 for delivered content in FIG. 8 may receive the content and content key not via network but via the recording medium which stores the delivered content of the first format, thereby achieving the similar processing.

(8) In the present embodiment, as an example sequence of content and key write processing of the recording device 200 for delivered content, the content and key of the first format are written, and thereafter the content and key of the second format are written. However the processing sequence shall not be limited to this. Similarly, as an example sequence of content and key write processing of the recording device 300 for local content, the content and key of the second format are written, and thereafter the content and key of the first format is written, but the processing sequence shall not be limited to this.

(9) In the present embodiment, the import flag is stored together with the encrypted content key of each format as a set. However it may not be stored in the same position as the encrypted content key. As far as the host device can judge the relation between content and the import flag, the import flag may be stored in anyplace. For example, information on import flag may be added and stored to the content data itself or to metadata of the content data.

In addition, a specified one bit (for example, most significant bit) in the content ID may be used for the import flag. In this case, it can be set that the bit value "0" means that the content roots is "first form" and the bit value "1" means that the content roots is "second form."

Furthermore, management information which manages correspondence between the content and the import flag may be additionally prepared and stored in the recording medium (see FIG. 21). In this case, it is possible to store the import flag in an area independent from the content. Consequently, there is no need to add an import flag individually for each format. For the content stored in multiple forms, at least one import flag that indicates the content root is required to exist.

(10) In the present embodiment, it has been explained that the import flag takes two values of "ON" and "OFF". However the present invention shall not be limited to this. All it needs is to store the content root and original storage format information, and it may not only be a flag but also may be a numerical value or character string.

(11) In the present embodiment, an example is shown in which the content editing device 600 judges the content roots to change over possibility/impossibility of editing. However content of edition may be changed over. For example, for the delivered content, editing of information such as content name is permitted, or for local content, the processing such as deletion, division, coupling of content may be permitted in addition to the editing of information.

(12) In the present embodiment, description is made primarily with music content as an example, but type of content shall not be limited to this. The content may be any one of or combinations of moving pictures, still images, texts, and programs.

The present invention has been described with respect to specific embodiments, but it is obvious to those skilled in the art that various changes and modifications and other uses may be made in the invention. Therefore, the present invention shall not be limited to specific disclosures made here but shall be limited only by the claims attached. By the way, the present invention relates to Japanese Patent Application, No. 2004-199174 (filed on Jul. 6, 2004), the content of which is incorporated herein by reference.

INDUSTRIAL APPLICABILITY

The present invention is able to apply to a recording medium in which the same content is stored in compliance with multiple formats, or a content recording device, content editing device for such recording medium, and so on.

The invention claimed is:
1. A recording medium, comprising:
a content receiver that receives content that has an original storage format;
a content storage that stores the received content in a plurality of formats;
a key storage that stores a content key that is used for encrypting the content, the content key being stored in the key storage in multiple formats; and
a format information storage that stores original storage format information of the content, the original storage format information indicating the original storage format of the content,
wherein the original storage format is an intrinsic storage format of the content,
the original storage format is different between a delivered content and a local content, and
the original storage format information is stored in the recording medium while being added to the content key stored in the recording medium.

2. The recording medium according to claim 1 wherein the delivered content is a content which is delivered via a network, and the local content is a content which is obtained from an other recording medium.

3. The recording medium according to claim 1, wherein the original storage format information is provided for each of contents stored in the recording medium, and
the recording medium further comprises a content manager configured to store management information that manages correspondence between the content and the original storage format information.

4. A recording device which records, in multiple formats, content that has an original storage format for storage to a recording medium and a content key which is a key for encrypting the content, the recording device comprising:
a content writer that writes the content in the recording medium in a first storage format which is a format of a delivered content or a second storage format which is a format of a local content; and
a key writer that writes the content key in the recording medium;
wherein the key writer adds original storage format information to the content key and then writes the content key in the recording medium, the original storage format information indicating the original storage format of the content written in the recording medium,
the original storage format is an intrinsic storage format of the content, and
the original storage format is different between the delivered content and the local content.

5. A reproducing device of a recording medium that stores content stored in multiple storage formats, a content key which is a key for encrypting the content, and original storage format information indicating an original storage format of the content, the reproducing device comprising:
a content reader that reads the content to be reproduced from the recording medium;
a key reader that reads out the content key for the content from the recording medium;
a storage format identifier that reads out original storage format information for the content from the content key; and
a content reproducer that changes over playback methods in accordance with the read original storage format information, and reproduces the content,
wherein the content key is read out from among a plurality of content keys of a plurality of formats,
each of the plurality of content keys includes an import flag that indicates the original storage format information for the content,
the original storage format is an intrinsic storage format of the content, the original storage format information is different between a delivered content and a local content, and the original storage format information is stored in the recording medium while being added to the content key stored in the recording medium.

6. The reproducing device according to claim 5, wherein the content reproducer determines whether the content to be reproduced is the local content according to the read original storage format information, and when the content to be reproduced is the local content, the content reproducer allows a special playback operation.

7. An information editing device of a recording medium that stores content that has an original storage format, including a first storage format and a second storage format, a content key for encrypting the content, and original storage format information that indicates the original storage format of the content, the information editing device comprising:

a first content reader/writer that reads the content and the content key stored in the first storage format from the recording medium and writes the content and the content key stored in the first storage format to the recording medium;

a second reader/writer that reads the content and the content key stored in the second storage format from the recording medium and writes the content and the content key stored in the second storage format to the recording medium;

a storage format identifier that reads the original storage format information from the recording medium; and an editor that edits one of the content and information concerning the content, wherein the original storage format is an intrinsic storage format of the content, the original storage format is different between a delivered content and a local content, the original storage format information is stored in the recording medium while being added to the content key stored in the recording medium, and the editor determines whether selected content to be edited is the local content according to the original storage format information, and, when the selected content to be edited is the local content, the editor displays a button for editing the selected content.

* * * * *